(12) United States Patent
Wu et al.

(10) Patent No.: US 11,809,880 B2
(45) Date of Patent: Nov. 7, 2023

(54) DYNAMICALLY VERIFYING INGRESS CONFIGURATION CHANGES

(71) Applicant: International Business Machines Corporation, Armonk, NY (US)

(72) Inventors: Wei Wu, Beijing (CN); Xin Peng Liu, Beijing (CN); Yue Wang, Beijing (CN); Liang Wang, Beijing (CN); Zheng Li, Beijing (CN); Biao Chai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 17/450,297

(22) Filed: Oct. 8, 2021

(65) Prior Publication Data

US 2023/0111430 A1    Apr. 13, 2023

(51) Int. Cl.
| | |
|---|---|
| *G06F 11/00* | (2006.01) |
| *G06F 9/445* | (2018.01) |
| *G06F 11/20* | (2006.01) |
| *G06F 9/54* | (2006.01) |
| *G06F 13/16* | (2006.01) |

(52) U.S. Cl.
CPC .......... *G06F 9/44505* (2013.01); *G06F 9/541* (2013.01); *G06F 11/2005* (2013.01); *G06F 13/1668* (2013.01)

(58) Field of Classification Search
CPC ... G06F 9/44505; G06F 9/541; G06F 11/2289
See application file for complete search history.

(56) References Cited

U.S. PATENT DOCUMENTS

| | | | |
|---|---|---|---|
| 10,135,914 B2 | 11/2018 | Sorenson, III et al. | |
| 2021/0019194 A1* | 1/2021 | Bahl | H04L 67/1031 |
| 2023/0065431 A1* | 3/2023 | Kumar | G06F 9/445 |

OTHER PUBLICATIONS

"NGINX Ingress Controller; How it Works," GitHub, accessed Oct. 7, 2021, 4 pages. https://kubernetes.github.io/ingress-nginx/how-it-works/#avoiding-outage-from-wrong-configuration.

(Continued)

*Primary Examiner* — Philip Guyton
(74) *Attorney, Agent, or Firm* — Yee & Associates, P.C.

(57) ABSTRACT

Dynamically verifying ingress configuration changes is provided. A temporary ingress controller configuration is generated for an ingress configuration change set contained in an ingress configuration change set dispatcher queue of an ingress controller pod. The temporary ingress controller configuration corresponding to the ingress configuration change set is loaded into a temporary ingress controller located in a temporary ingress controller pod of the computer. A health check is performed on the temporary ingress controller pod running the temporary ingress controller with the temporary ingress controller configuration corresponding to the ingress configuration change set. The temporary ingress controller configuration is used as a configuration for an ingress controller located in the ingress controller pod of the computer based on the health check indicating that the temporary ingress controller pod did not crash while running the temporary ingress controller with the temporary ingress controller configuration corresponding to the ingress configuration change set.

20 Claims, 17 Drawing Sheets

(56) References Cited

OTHER PUBLICATIONS

Flant Staff, "Comparing Ingress controllers for Kubernetes," Medium, Oct. 10, 2019, accessed Oct. 7, 2021, 13 pages. https://medium.com/flant-com/comparing-ingress-controllers-for-kubernetes-9b397483b46b.

"Ingress," VMware, Inc., Aug. 3, 2021, accessed Oct. 7, 2021, 7 pages. https://docs.vmware.com/cn/VMware-NSX-T-Data-Center/3.1/ncp-kubernetes/GUID-E03D6EE5-9C6C-457F-AD81-25CF2056F4D8.html.

Hao, "Maintain your containerized application's availability during a cloud update," IBM Developer Blog, Apr. 24, 2019, accessed Jun. 23, 2021, 9 pages. https://developer.ibm.com/blogs/maintain-containerized-application-availability-during-cloud-upgrade/.

Noland, "Option in cluster.yml to enable nginx-ingress-controller validating webhook," GitMemory, accessed Jun. 23, 2021, 2 pages. https://www.gitmemory.com/issue/rancher/rke/2116/642310954.

Brand, "Improving the multi-team Kubernetes ingress experience with Heptio Contour 0.6," Medium, Oct. 10, 2018, accessed Jun. 23, 2021, 5 pages. https://blog.heptio.com/improving-the-multi-team-kubernetes-ingress-experience-with-heptio-contour-0-6-55ae0c0cadef.

"Handling Host Collisions," NGINX Docs, F5, Inc., accessed Jun. 23, 2021, 4 pages.

"Using Admission Controllers," The Kubernetes Authors, Jun. 20, 2021, accessed Jun. 23, 2021, 13 pages. https://kubernetes.io/docs/reference/access-authn-authz/admission-controllers/#validatingadmissionwebhook.

\* cited by examiner

DYNAMICALLY VERIFYING INGRESS CONFIGURATION CHANGES

BACKGROUND

1. Field

The disclosure relates generally to orchestration platforms and more specifically to dynamically verifying whether incoming ingress configuration changes to a running orchestration platform are valid based on performing pre-verification, parallel verification, and final verification processes on temporary ingress controller configurations that correspond to different incoming ingress configuration changes using temporary ingress controller pods on a worker node of the running orchestration platform.

2. Description of the Related Art

An orchestration platform, such as, for example, Kubernetes® (a registered trademark of the Linux Foundation of San Francisco, California), provides an architecture for automating deployment, scaling, and operations of application workloads across clusters of worker nodes. Many cloud services offer an orchestration platform as a service (e.g., Platform-as-a-Service, Infrastructure-as-a-Service, or the like).

SUMMARY

According to one illustrative embodiment, a computer-implemented method for dynamically verifying ingress configuration changes is provided. A computer generates a temporary ingress controller configuration for an ingress configuration change set contained in an ingress configuration change set dispatcher queue of an ingress controller pod located on the computer. The computer loads the temporary ingress controller configuration corresponding to the ingress configuration change set into a temporary ingress controller located in a temporary ingress controller pod of the computer. The computer performs a health check on the temporary ingress controller pod running the temporary ingress controller with the temporary ingress controller configuration corresponding to the ingress configuration change set. The computer uses the temporary ingress controller configuration as a configuration for an ingress controller located in the ingress controller pod of the computer based on the health check indicating that the temporary ingress controller pod did not crash while running the temporary ingress controller with the temporary ingress controller configuration corresponding to the ingress configuration change set. According to other illustrative embodiments, a computer system and computer program product for dynamically verifying ingress configuration changes are provided.

DETAILED DESCRIPTION

Figure 1:
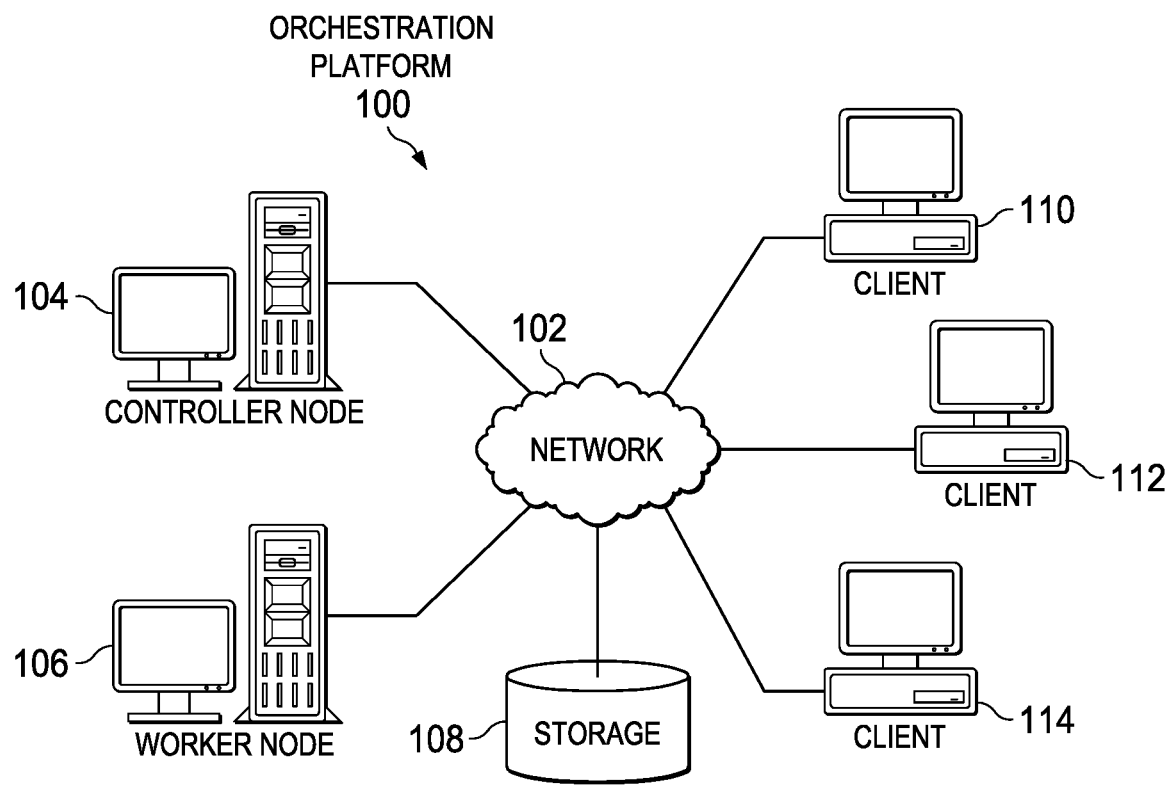
FIG. 1 is a pictorial representation of an orchestration platform in which illustrative embodiments may be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
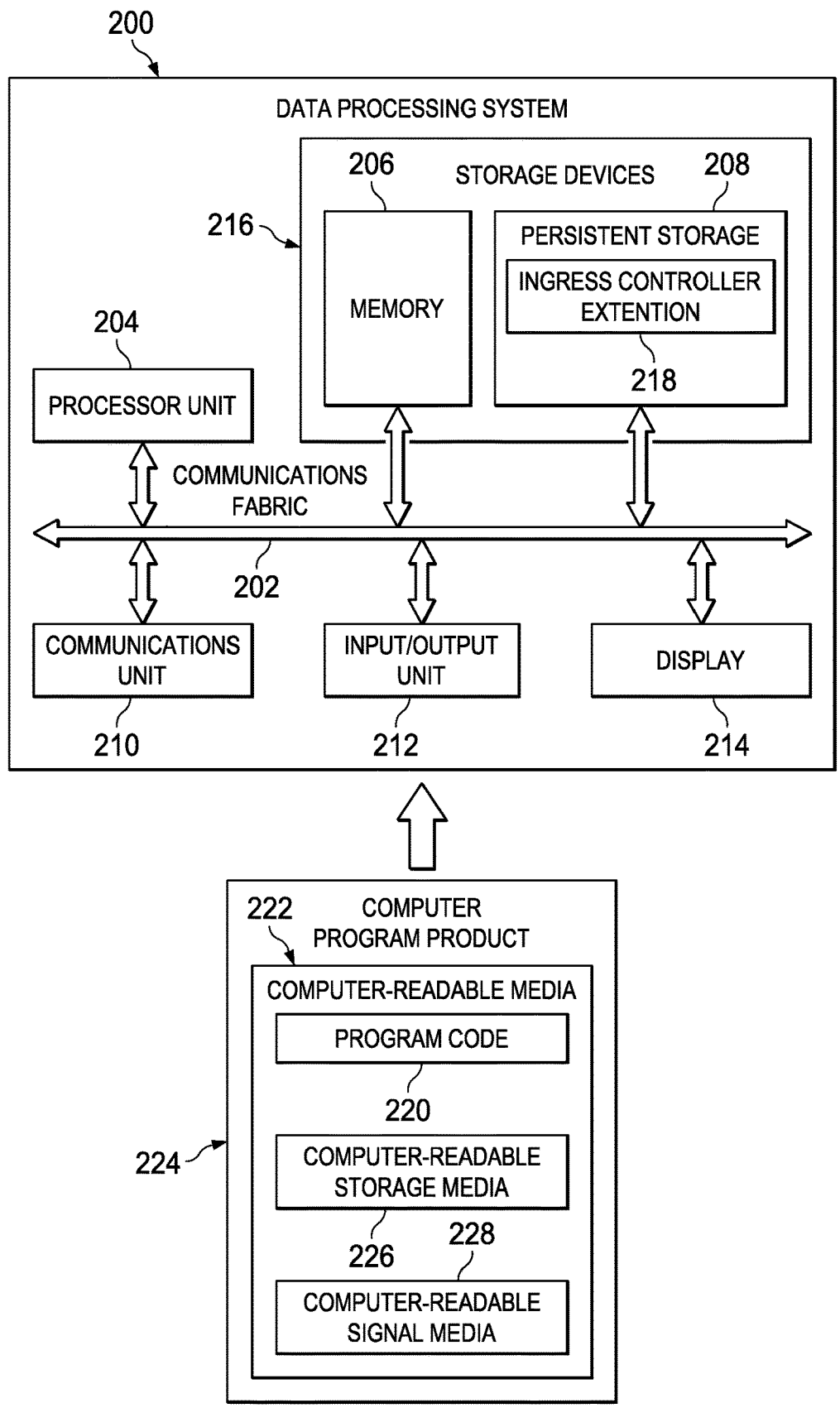
FIG. 2 is a diagram of a data processing system in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of an orchestration platform in which illustrative embodiments may be implemented. Orchestration platform 100 is a network of computers, data processing systems, and other devices in which the illustrative embodiments may be implemented. Orchestration platform 100 provides automatic deployment, scaling, and operations of application workloads corresponding to a set of services hosted by orchestration platform 100.

Orchestration platform 100 may be, for example, a Kubernetes platform. However, Kubernetes is intended as an example only and not as a limitation on illustrative embodiments. In other words, illustrative embodiments may be implemented in any type of orchestration platform, infrastructure, or environment.

Orchestration platform 100 includes network 102, which is the medium used to provide communications links between the computers, data processing systems, and other devices connected together within orchestration platform 100. Network 102 may include connections, such as, for example, wire communication links, wireless communication links, fiber optic cables, and the like.

In the depicted example, orchestration platform 100 includes controller node 104 and worker node 106, along with storage 108. Controller node 104 and worker node 106 may be, for example, server computers with high-speed connections to network 102. In addition, controller node 104 and worker node 106 may each represent a cluster of server computers in one or more data centers. Alternatively, controller node 104 and worker node 106 may each represent multiple computing nodes in one or more cloud environments. Further, controller node 104 and worker node 106 may each include a set of virtual machines.

Controller node 104 is a main controlling unit for a cluster of worker nodes, which is represented by worker node 106, by managing the cluster's workload and directing communication across the cluster. Controller node 104 receives requests from users to perform application workloads corresponding to the set of services hosted by orchestration platform 100. Worker node 106 is a machine, either physical or virtual, where an application workload, which corresponds to a service, is deployed. Worker node 106 hosts the components of the application workload.

Client 110, client 112, and client 114 also connect to network 102. Clients 110, 112, and 114 are clients of controller node 104 and worker node 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart televisions, and the like, with wire or wireless communication links to network 102.

Users of clients 110, 112, and 114 may utilize clients 110, 112, and 114 to submit requests to perform the application workloads corresponding to the set of services hosted by orchestration platform 100. An application workload may be any type of workload, such as, for example, data processing, image processing, transaction processing, sensor monitoring, scientific calculations, forecasts, predictions, or the like. It should be noted that client device users may also include, for example, application developers who provide the applications for the set of services hosted by orchestration platform 100. The application developers may submit, for example, ingress configuration changes for modifying how an ingress controller manages service requests.

Storage 108 is a network storage device capable of storing any type of data in a structured format or an unstructured format. In addition, storage 108 may represent a plurality of network storage devices. Further, storage 108 may store identifiers and network addresses for a plurality of server computers, identifiers and network addresses for a plurality of client devices, identifiers for a plurality of client device users, a plurality of different ingress configuration change sets, configuration maps, and the like. Furthermore, storage 108 may store other types of data, such as authentication or credential data that may include usernames, passwords, and the like associated with client device users, for example.

In addition, it should be noted that orchestration platform 100 may include any number of additional controller nodes, worker nodes, client devices, storage devices, and other devices not shown. Program code located in orchestration platform 100 may be stored on a computer-readable storage medium or a set of computer-readable storage media and downloaded to a computer or other data processing device for use. For example, program code may be stored on a computer-readable storage medium on controller node 104 and downloaded to worker node 106 over network 102 for use on worker node 106.

In the depicted example, orchestration platform 100 may be implemented as a number of different types of communication networks, such as, for example, an internet, an intranet, a wide area network, a local area network, a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

With reference now to FIG. 2, a diagram of a data processing system is depicted in accordance with an illustrative embodiment. Data processing system 200 is an example of a computer, such as, for example, worker node 106 in FIG. 1, in which computer-readable program code or instructions implementing the ingress configuration change verification processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer-readable storage device or a computer-readable storage medium is any piece of hardware that is capable of storing information, such as, for example, without limitation, data, computer-readable program code in functional form, and/or other suitable information either on a transient basis or a persistent basis. Further, a computer-readable storage device or a computer-readable storage medium excludes a propagation medium, such as transitory signals. Furthermore, a computer-readable storage device or a computer-readable storage medium may represent a set of computer-readable storage devices or a set of computer-readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores ingress controller extension 218. However, it should be noted that even though ingress controller extension 218 is illustrated as residing in persistent storage 208, in an alternative illustrative embodiment, ingress controller extension 218 may be a separate component of data processing system 200. For example, ingress controller extension 218 may be a hardware component coupled to communication fabric 202 or a combination of hardware and software components.

Ingress controller extension 218 controls the process of dynamically verifying whether incoming ingress configuration changes, which are submitted by a set of users, are valid based on performing pre-verification, parallel verification, and final verification processes on temporary ingress controller configurations that correspond to the different incoming ingress configuration changes using temporary ingress controller pods generated on data processing system 200. As a result, data processing system 200 operates as a special purpose computer system in which ingress controller extension 218 in data processing system 200 enables verification of new incoming ingress configuration changes to prevent failure of an ingress controller pod running on data processing system 200. In particular, ingress controller extension 218 transforms data processing system 200 into a special purpose computer system as compared to currently available general computer systems that do not have ingress controller extension 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer-readable program code that may be read and run by a processor in processor unit 204. The program instructions, in the different embodiments, may be embodied on different physical computer-readable storage devices, such as memory 206 or persistent storage 208.

Program code 220 is located in a functional form on computer-readable media 222 that is selectively removable and may be loaded onto or transferred to data processing system 200 for running by processor unit 204. Program code 220 and computer-readable media 222 form computer program product 224. In one example, computer-readable media 222 may be computer-readable storage media 226 or computer-readable signal media 228.

In these illustrative examples, computer-readable storage media 226 is a physical or tangible storage device used to store program code 220 rather than a medium that propagates or transmits program code 220. Computer-readable storage media 226 may include, for example, an optical or magnetic disc that is inserted or placed into a drive or other device that is part of persistent storage 208 for transfer onto a storage device, such as a hard drive, that is part of persistent storage 208. Computer-readable storage media 226 also may take the form of a persistent storage, such as a hard drive, a thumb drive, or a flash memory that is connected to data processing system 200.

Alternatively, program code 220 may be transferred to data processing system 200 using computer-readable signal media 228. Computer-readable signal media 228 may be, for example, a propagated data signal containing program code 220. For example, computer-readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer-readable media 222" can be singular or plural. For example, program code 220 can be located in computer-readable media 222 in the form of a single storage device or system. In another example, program code 220 can be located in computer-readable media 222 that is distributed in multiple data processing systems. In other words, some instructions in program code 220 can be located in one data processing system while other instructions in program code 220 can be located in one or more other data processing systems. For example, a portion of program code 220 can be located in computer-readable media 222 in a server computer while another portion of program code 220 can be located in computer-readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

Ingress is API object that manages external access to services hosted in an orchestration platform cluster, typically HTTP. In other words, ingress is an API object that provides routing rules to manage external users' access to services in a cluster of worker nodes in the orchestration platform. Ingress exposes HTTP and HTTPS routes from outside the cluster to services within the cluster. Traffic routing is controlled by the routing rules defined on the ingress resource.

Each ingress has a set of configuration annotations or values. Typically, incoming ingress configurations are combined into a configuration for an ingress controller. The ingress controller is responsible for fulfilling an ingress. Typically, the ingress controller includes a load balancer for routing external traffic to the cluster.

If an incoming ingress, which corresponds to a hosted service, includes an invalid configuration annotation and is merged with the configuration of the ingress controller, then the entire ingress controller pod will crash or fail to start due to the invalid configuration. Another failure of the ingress controller pod may be caused by two incoming ingress configurations that conflict. For example, if two ingress configurations are correct, but both configurations include an annotation pointing to the same redirect rule, then the entire ingress controller pod will crash or fail to start due to the conflicting ingress configurations.

Illustrative embodiments enhance the ingress controller refresh mechanism to avoid ingress controller failures or outages. For example, illustrative embodiments add new components (e.g., an incoming ingress configuration change dispatcher queue and an ingress controller extension) to the ingress controller to monitor for and verify incoming ingress configuration changes. The incoming ingress configuration change dispatcher queue may be, for example, a first in/first out depth queue. Illustrative embodiments generate and deploy a temporary ingress controller pod with a temporary ingress controller having a temporary ingress controller configuration corresponding to a new incoming ingress configuration change.

Illustrative embodiments verify that the temporary ingress controller having the temporary ingress controller configuration corresponding to the new incoming ingress configuration change running on the temporary ingress controller pod is working correctly by performing a health check on the temporary ingress controller pod. In response to verifying that the temporary ingress controller works using the temporary ingress controller configuration corresponding to the new incoming ingress configuration change, illustrative embodiments remove the current configuration of the ingress controller and use the temporary ingress controller configuration as a final configuration for the ingress controller. In response to determining that the temporary ingress controller does not work (e.g., failed, crashed, or the like) using the temporary ingress controller configuration corresponding to the new incoming ingress configuration change because the new incoming ingress configuration change is invalid, illustrative embodiments notify a user, such as, for example, an application developer, regarding the invalid ingress configuration change.

Thus, illustrative embodiments avoid single ingress configuration error crashes of the entire ingress controller pod in a running orchestration platform by preventing any invalid incoming ingress configuration changes to be merged with the configuration of the ingress controller. Consequently, illustrative embodiments prevent negative impact on current services hosted by the orchestration platform that may be caused by invalid or conflicting ingress configuration changes. Therefore, performance of the running orchestration platform is maintained by preventing failures or crashes of the ingress controller pod.

Accordingly, illustrative embodiments provide one or more technical solutions that overcome a technical problem with merging new incoming ingress configuration changes with a configuration of an ingress controller in a running orchestration platform. As a result, these one or more technical solutions provide a technical effect and practical application in the field of orchestration platforms.

Figure 3A:
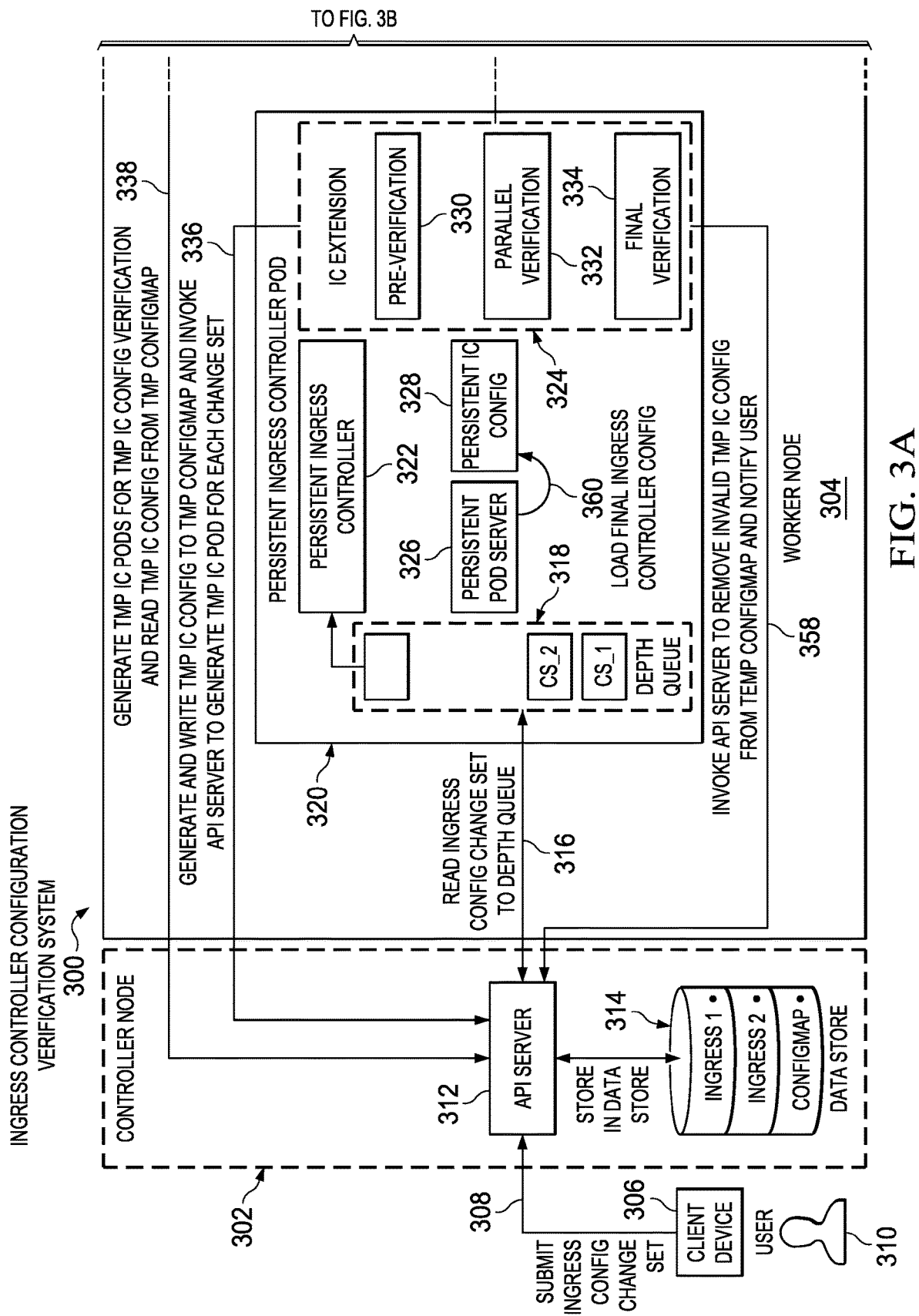
FIGS. 3A-3B are a diagram illustrating an example of an ingress controller configuration verification system in accordance with an illustrative embodiment.
Figure 3B:
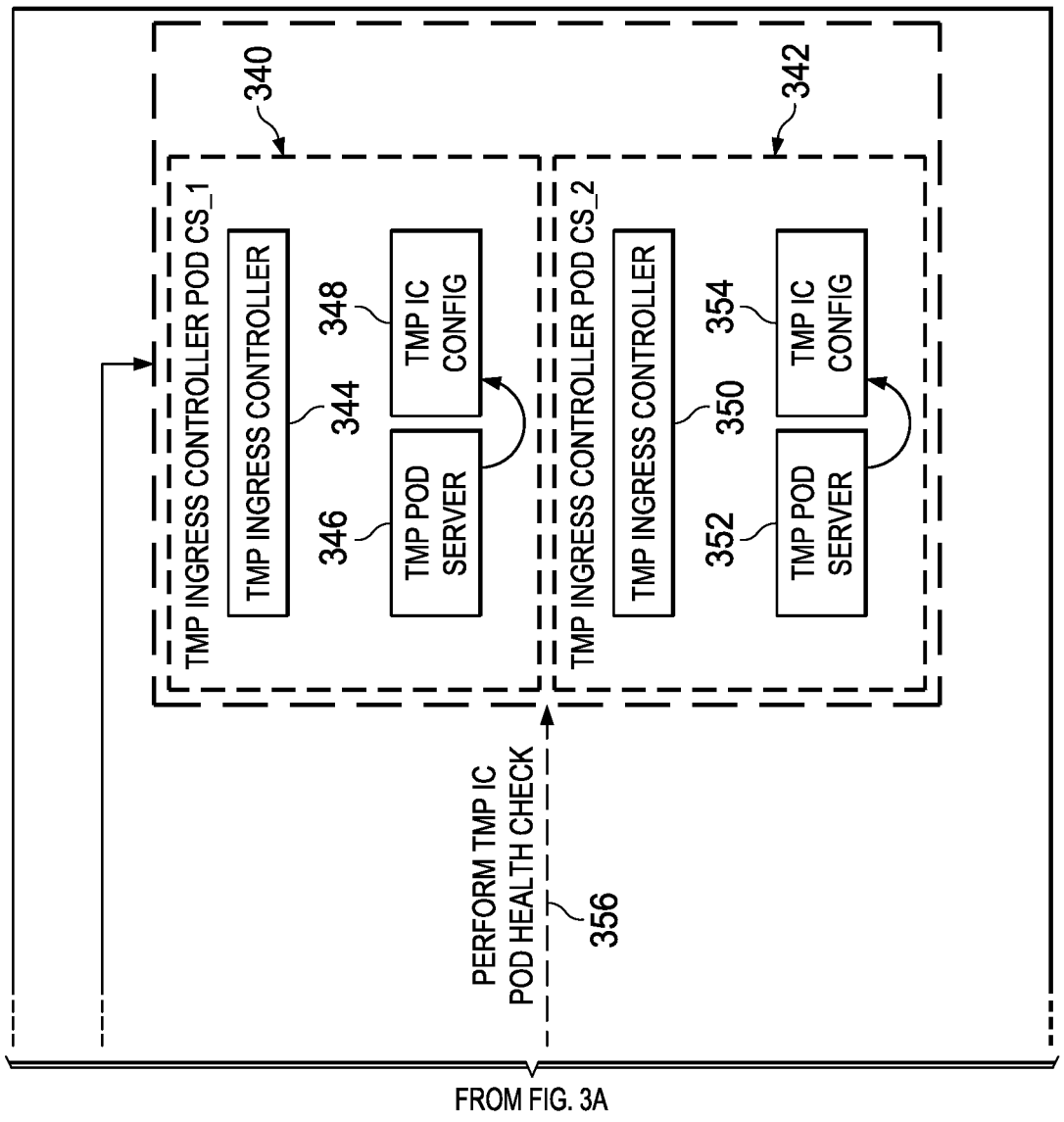

With reference now to FIGS. 3A-3B are, a diagram illustrating an example of an ingress controller configuration verification system is depicted in accordance with an illustrative embodiment. Ingress controller configuration verification system 300 may be implemented in a network of data processing systems, such as orchestration platform 100 in FIG. 1. Ingress controller configuration verification system 300 is a system of hardware and software components for dynamically verifying whether incoming ingress configuration changes are valid prior to merging any of the incoming ingress configuration changes with a configuration of an ingress controller to prevent failure of the ingress controller and, therefore, failure of one or more services hosted by the orchestration platform.

In this example, ingress controller configuration verification system 300 includes controller node 302, worker node 304, and client device 306, such as, for example, controller node 104, worker node 106, and client 110 in FIG. 1. However, it should be noted that ingress controller configuration verification system 300 is intended as an example only and not as a limitation on illustrative embodiments. For example, ingress controller configuration verification system 300 may include any number of controller nodes, worker nodes, and client devices, and other devices and components not shown.

At 308, user 310 utilizes client device 306 to submit an ingress configuration change set to controller node 302 via application programming interface (API) server 312. While the term API server is generally used in the Kubernetes paradigm, the term as used herein is not limited to that environment but rather refers to any type of component that can provide both internal and external interfaces for an orchestration platform and deploy application workloads corresponding to services hosted on worker nodes of the orchestration platform. The orchestration platform may be, for example, orchestration platform 100 in FIG. 1. User 310 may be, for example, an application developer who created an application that corresponds to a service hosted on worker node 304. API server 312 stores the ingress configuration change set in data store 314.

At 316, API server 312 reads the ingress configuration change set to depth queue 318. In this example, depth queue 318 stores ingress configuration change set 1 (CS_1) and ingress configuration change set 2 (CS_2). Depth queue 318 is a component of persistent ingress controller pod 320 and may be, for example, a first in/first out ingress configuration change set dispatcher queue. Persistent ingress controller pod 320 also includes persistent ingress controller 322, ingress controller extension 324, persistent pod server 326, and persistent ingress controller (IC) configuration 328. Persistent ingress controller configuration 328 is a base or current configuration for persistent ingress controller 322. Each of ingress configuration change set 1 and ingress configuration change set 2 in depth queue 318 represent a set of modifications or alterations to persistent ingress controller configuration 328.

Ingress controller extension 324 may be, for example, ingress controller extension 218 in FIG. 2. Ingress controller extension 324 performs pre-verification process 330, parallel verification process 332, and final verification process 334 on temporary ingress controller configurations corresponding to incoming ingress configuration changes (e.g., ingress configuration change set 1 and ingress configuration change set 2).

At 336, ingress controller extension 324 generates and writes a temporary ingress controller configuration for each respective ingress configuration change set (e.g., ingress configuration change set 1 and ingress configuration change set 2) to a temporary configuration map in data store 314. In addition, ingress controller extension 324 invokes API server 312 to generate a separate temporary ingress controller pod for each of the ingress configuration change sets (e.g., ingress configuration change set 1 and ingress configuration change set 2).

At 338, API server 312 generates the temporary ingress controller pod, such as temporary ingress controller pod for ingress configuration change set 1 340 and temporary ingress controller pod for ingress configuration change set 2 342, for temporary ingress controller configuration verification. Temporary ingress controller pod for ingress configuration change set 1 340 includes temporary ingress controller 344, temporary pod server 346, and temporary ingress controller configuration 348. Temporary ingress controller pod for ingress configuration change set 2 342 includes temporary ingress controller 350, temporary pod server 352, and temporary ingress controller configuration 354.

Also at 338, API server 312 reads the temporary ingress controller configurations from the temporary configuration map to worker node 304. Worker node 304, using ingress controller extension 324, loads the temporary ingress controller configurations, such as temporary ingress controller configuration 348 and temporary ingress controller configuration 354, into temporary ingress controller pod for ingress configuration change set 1 340 and temporary ingress controller pod for ingress configuration change set 2 342, respectively.

At 356, ingress controller extension 324 performs a health check on temporary ingress controller pod for ingress configuration change set 1 340 and temporary ingress controller pod for ingress configuration change set 2 342 to determine whether temporary ingress controller pod for ingress configuration change set 1 340 and temporary ingress controller pod for ingress configuration change set 2 342 are running correctly or are crashed due to using temporary ingress controller configuration 348, which corresponds to ingress configuration change set 1, and temporary ingress controller configuration 354, which corresponds to ingress configuration change set 2.

At 358, in response to detecting a crash or failure in either temporary ingress controller pod for ingress configuration change set 1 340 or temporary ingress controller pod for ingress configuration change set 2 342 during the health check, ingress controller extension 324 invokes API server 312 to remove the invalid temporary ingress controller configuration from the temporary configuration map. Furthermore, ingress controller extension 324 notifies user 310 of the particular ingress configuration change set that caused the invalid temporary ingress controller configuration.

At 360, in response to determining that at least one of temporary ingress controller pod for ingress configuration change set 1 340 or temporary ingress controller pod for ingress configuration change set 2 342 are running correctly with a valid temporary ingress controller configuration during the health check, ingress controller extension 324 uses the valid temporary ingress controller configuration as a final ingress controller configuration and directs persistent pod server 326 to load the final ingress controller configuration into persistent ingress controller configuration 328.

Figure 4A:
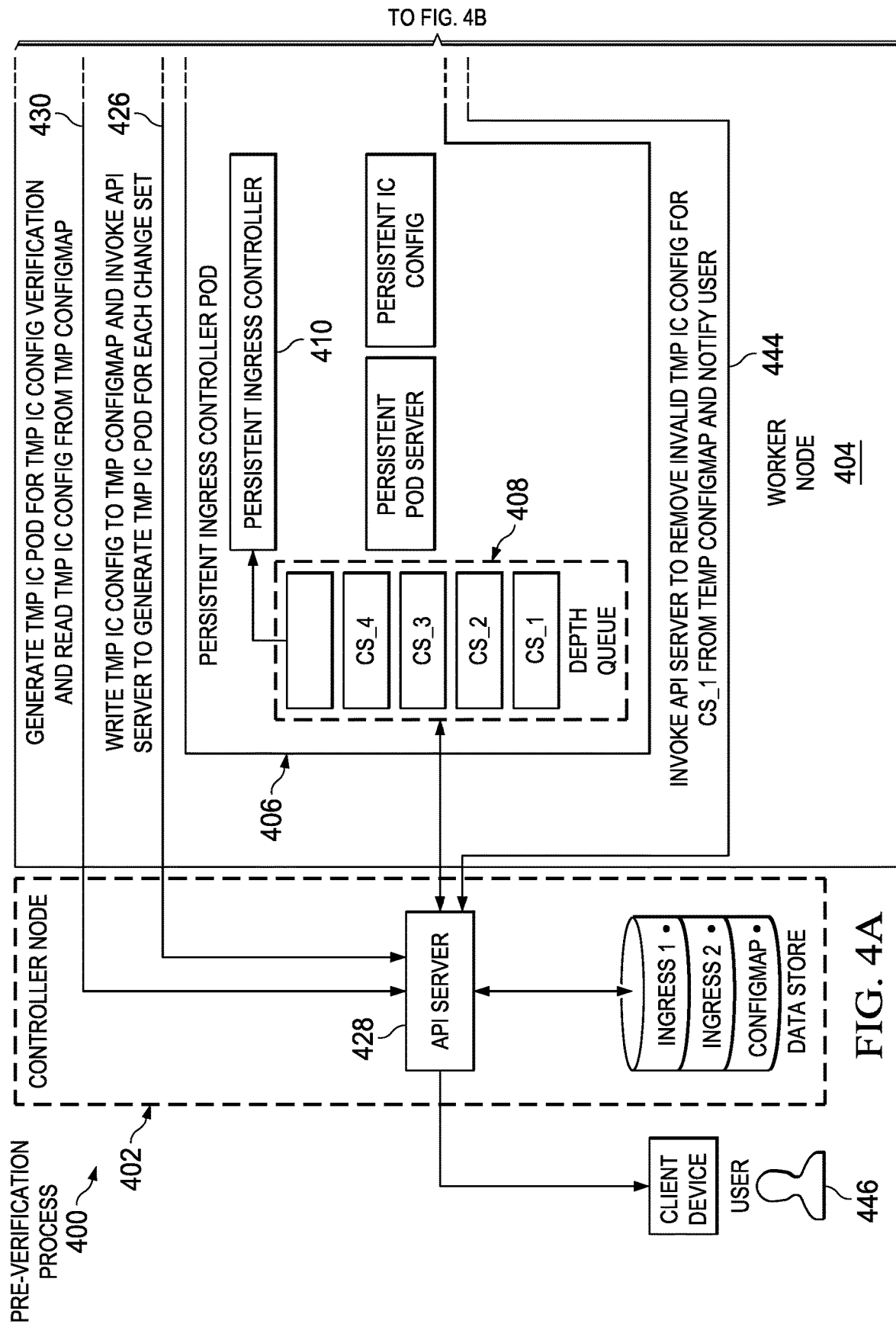
FIGS. 4A-4B are a diagram illustrating an example of a pre-verification process in accordance with an illustrative embodiment.
Figure 4B:
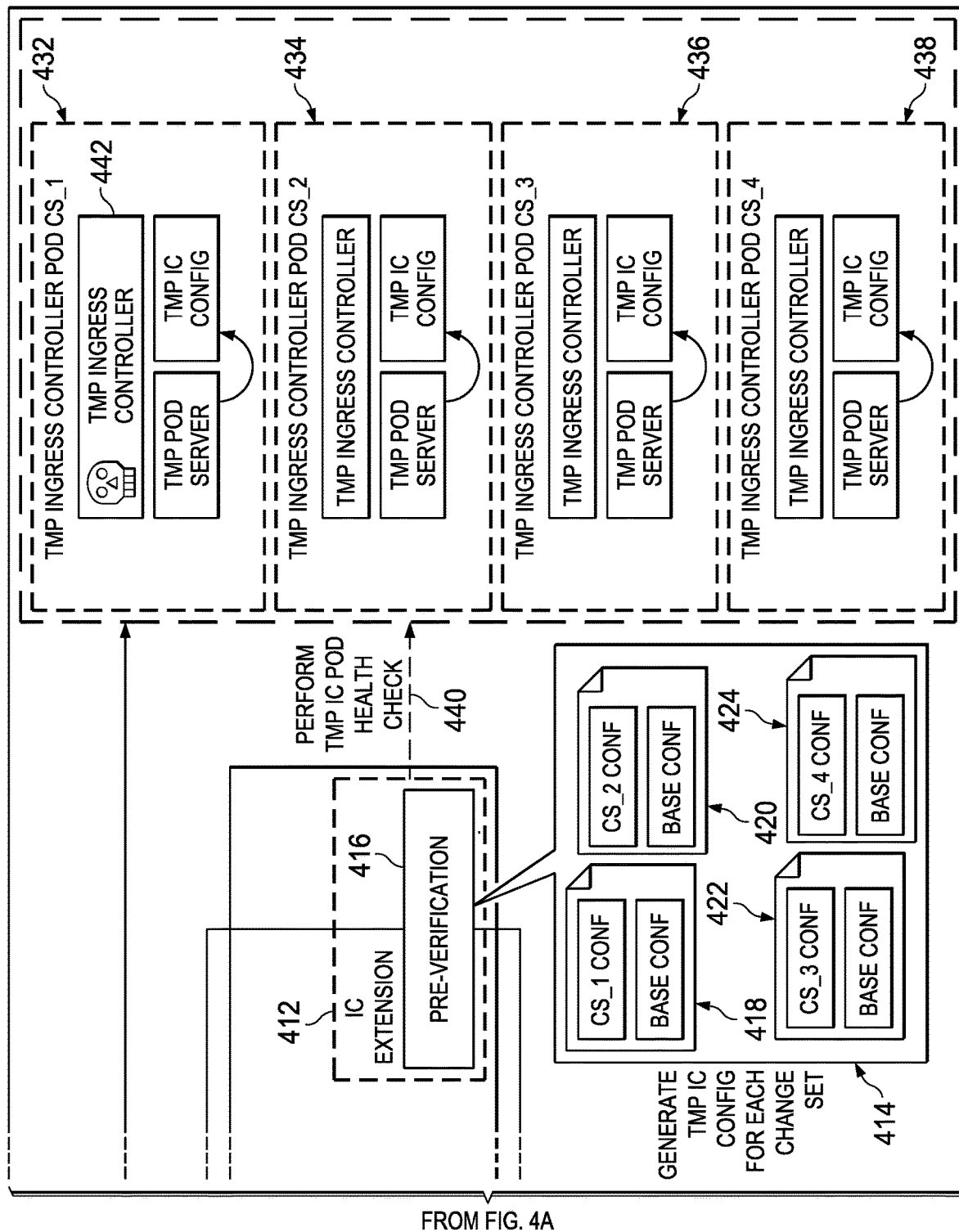

With reference now to FIGS. 4A-4B, a diagram illustrating an example of a pre-verification process is depicted in accordance with an illustrative embodiment. Pre-verification process 400 may be implemented in an ingress controller extension, such as, for example, pre-verification process 330 implemented in ingress controller extension 324 in FIG. 3A.

In this example, pre-verification process 400 includes controller node 402 and worker node 404, such as, for example, controller node 302 and worker node 304 in FIGS. 3A-3B. Worker node 404 includes persistent ingress controller pod 406, such as, for example, persistent ingress controller pod 320 in FIG. 3A. Persistent ingress controller pod 406 includes depth queue 408, persistent ingress controller 410, and ingress controller extension 412, such as, for example, depth queue 318, persistent ingress controller 322, and ingress controller extension 324 in FIG. 3A.

At 414, ingress controller extension 412 utilizes pre-verification process 416 to generate a temporary ingress controller configuration for each ingress configuration change set (e.g., ingress configuration change set 1 (CS_1), ingress configuration change set 2 (CS_2), ingress configuration change set 3 (CS_3), and ingress configuration change set 4 (CS_4)) contained in depth queue 408. It should be noted that each of ingress configuration change set 1, ingress configuration change set 2, ingress configuration change set 3, and ingress configuration change set 4 only represent a set of changes to the base or currently existing configuration of persistent ingress controller 410. Pre-verification process 416 generates each of temporary ingress controller configuration corresponding to ingress configuration change set 1 (CS_1 Conf) 418, temporary ingress controller configuration corresponding to ingress configuration change set 2 (CS_2 Conf) 420, temporary ingress controller configuration corresponding to ingress configuration change set 3 (CS_3 Conf) 422, and temporary ingress controller configuration corresponding to ingress configuration change set 4 (CS_4 Conf) 424 based on the existing configuration of persistent ingress controller 410.

At 426, ingress controller extension 412 writes the temporary ingress controller configurations corresponding to each of the different ingress configuration change sets (e.g., temporary ingress controller configuration corresponding to ingress configuration change set 1 418, temporary ingress controller configuration corresponding to ingress configuration change set 2 420, temporary ingress controller configuration corresponding to ingress configuration change set 3 422, and temporary ingress controller configuration corresponding to ingress configuration change set 4 424) to a temporary configuration map and invokes API server 428 to generate a temporary ingress controller pod for each of the different ingress configuration change sets. At 430, API server 312 generates a temporary ingress controller pod for each respective ingress configuration change set (e.g., temporary ingress controller pod for ingress configuration change set 1 432, temporary ingress controller pod for ingress configuration change set 2 434, temporary ingress controller pod for ingress configuration change set 3 436, and temporary ingress controller pod for ingress configuration change set 4 438) for temporary ingress controller configuration verification.

Also at 430, API server 428 reads the temporary ingress controller configurations from the temporary configuration map to worker node 404. Worker node 404, using ingress controller extension 412, loads a particular temporary ingress controller configuration into a certain temporary ingress controller corresponding to particular ingress configuration change set.

At 440, ingress controller extension 412 performs a health check on temporary ingress controller pod for ingress configuration change set 1 432, temporary ingress controller pod for ingress configuration change set 2 434, temporary ingress controller pod for ingress configuration change set 3 436, and temporary ingress controller pod for ingress configuration change set 4 438 to determine whether a particular temporary ingress controller pod is crashed due to a temporary ingress controller having an invalid configuration that corresponds to a particular ingress configuration change set. In this example, the health check determined that temporary ingress controller pod for ingress configuration change set 1 432 crashed and is not working because temporary ingress controller 442 has an invalid configuration, which corresponds to ingress configuration change set 1.

At 444, in response to detecting the crash of temporary ingress controller pod for ingress configuration change set 1 432, ingress controller extension 412 removes ingress configuration change set 1 (CS_1) from depth queue 408 and invokes API server 428 to remove the invalid temporary ingress controller configuration, which corresponds to ingress configuration change set 1, from the temporary configuration map. Furthermore, ingress controller extension 412 notifies user 446 that ingress configuration change set 1 created the invalid configuration for temporary ingress controller 442.

Figure 5A:
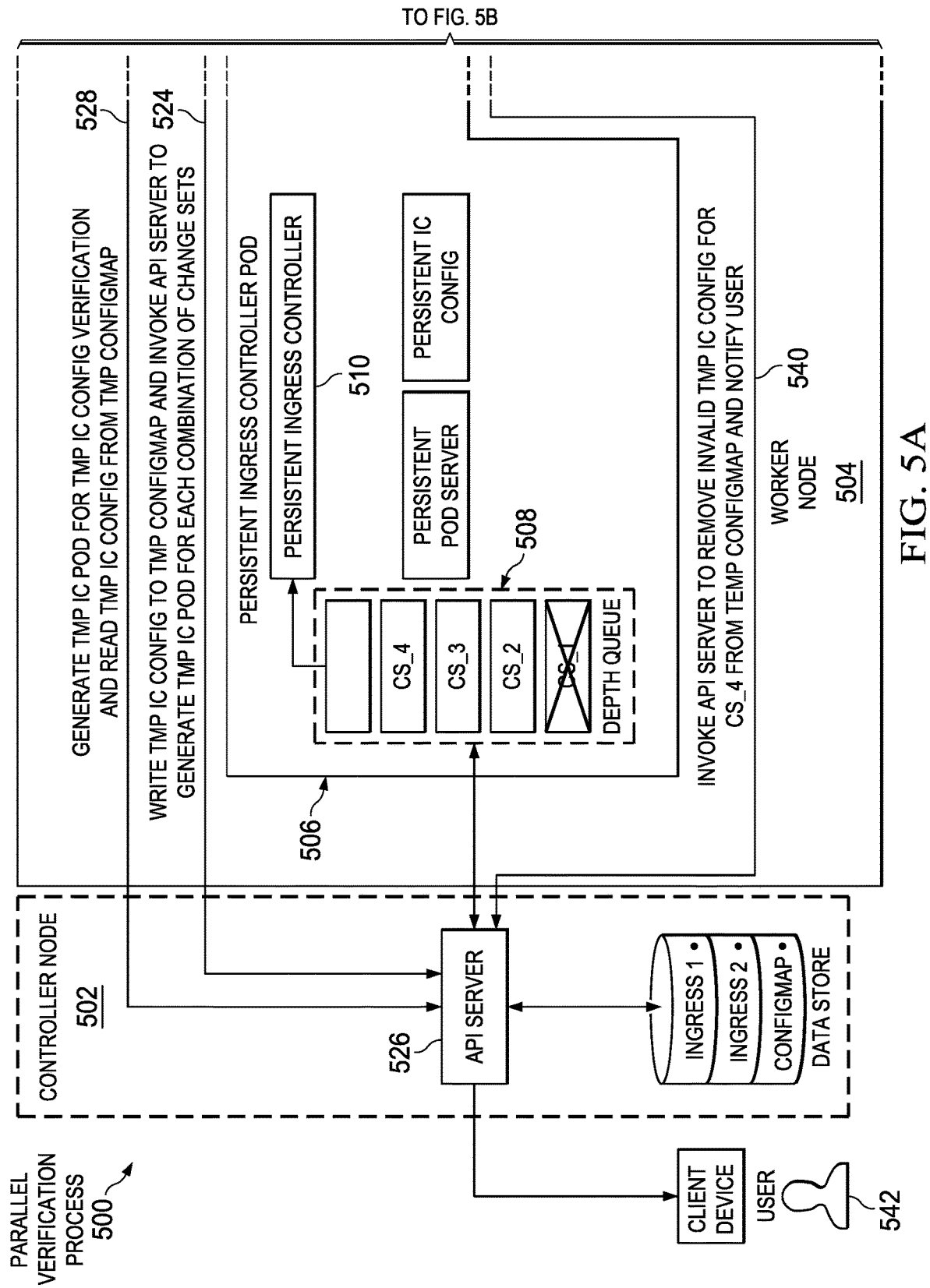
FIGS. 5A-5B are a diagram illustrating an example of a parallel verification process in accordance with an illustrative embodiment.
Figure 5B:
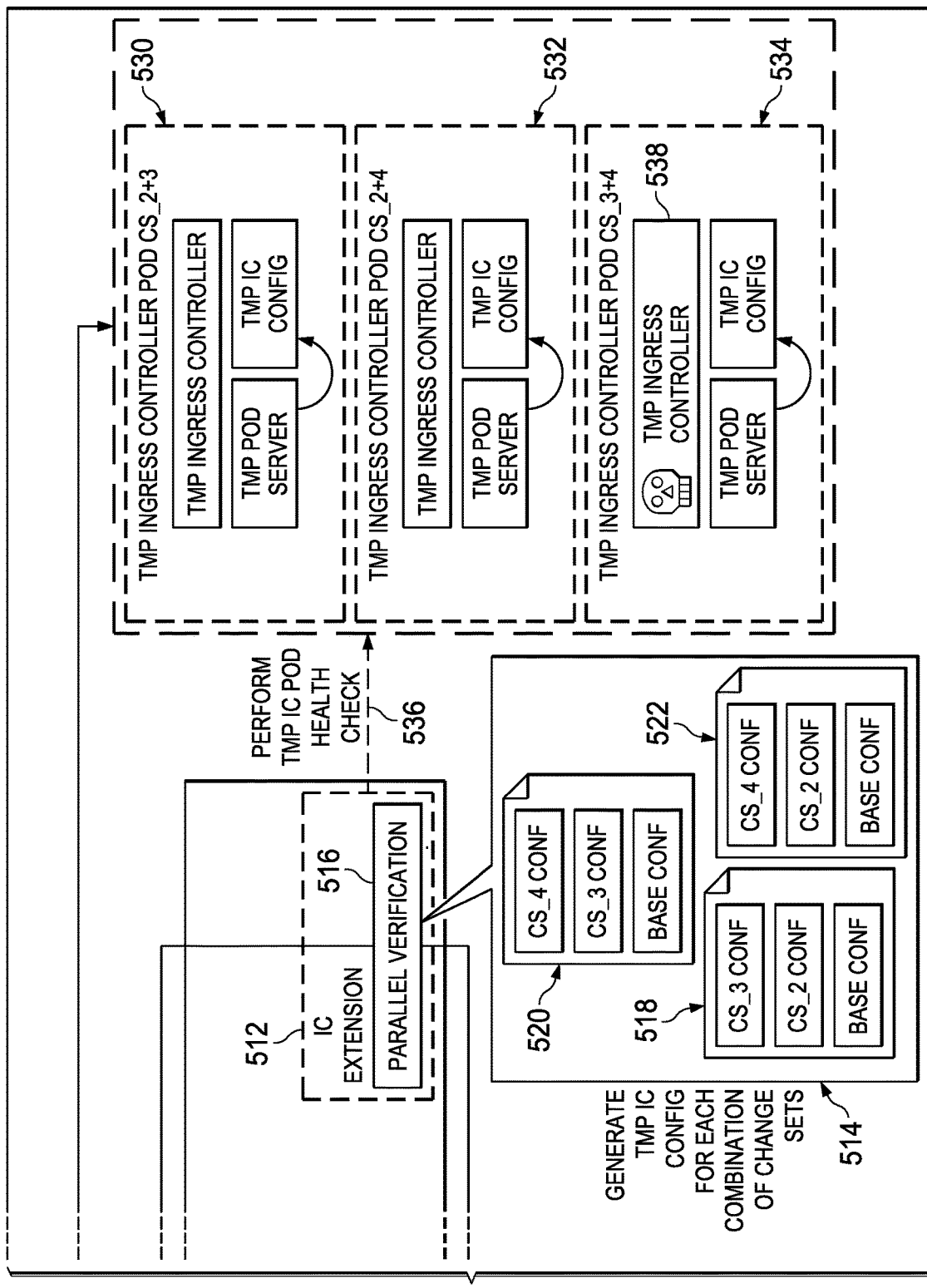

With reference now to FIGS. 5A-5B, a diagram illustrating an example of a parallel verification process is depicted in accordance with an illustrative embodiment. Parallel verification process 500 may be implemented in an ingress controller extension, such as, for example, parallel verification process 332 implemented in ingress controller extension 324 in FIG. 3A.

In this example, parallel verification process 500 includes controller node 502 and worker node 504, such as, for example, controller node 402 and worker node 404 in FIGS. 4A-4B. Worker node 504 includes persistent ingress controller pod 506, such as, for example, persistent ingress controller pod 406 in FIGS. 4A-4B. Persistent ingress controller pod 506 includes depth queue 508, persistent ingress controller 510, and ingress controller extension 512, such as, for example, depth queue 408, persistent ingress controller 410, and ingress controller extension 412 in FIGS. 4A-4B.

At 514, ingress controller extension 512 utilizes parallel verification process 516 to generate a temporary ingress controller configuration for each combination of ingress configuration change sets remaining in depth queue 508 (e.g., ingress configuration change set 2 (CS_2), ingress configuration change set 3 (CS_3), and ingress configuration change set 4 (CS_4)) after removing any invalid ingress configuration change set (e.g., ingress configuration set 1 (CS_1) during pre-verification process 400 in FIGS. 4A-4B. Parallel verification process 516 generates temporary ingress controller configuration for combination of ingress configuration change sets 2+3 (CS_2 Conf, CS_3 Conf) 518, temporary ingress controller configuration for combination of ingress configuration change sets 3+4 (CS_3 Conf, CS_4 Conf) 520, and temporary ingress controller configuration for combination of ingress configuration change sets 2+4 (CS_2 Conf, CS_4 Conf) 522 based on the base or currently existing configuration of persistent ingress controller 510.

At 524, ingress controller extension 512 writes the temporary ingress controller configurations corresponding to each of the different combinations of ingress configuration change sets (e.g., temporary ingress controller configuration for combination of ingress configuration change sets 2+3 518, temporary ingress controller configuration for combination of ingress configuration change sets 3+4 520, and temporary ingress controller configuration for combination of ingress configuration change sets 2+4 522) to a temporary configuration map and invokes API server 526 to generate a temporary ingress controller pod for each of the different combinations of ingress configuration change sets. At 528, API server 526 generates each respective temporary ingress controller pod (e.g., temporary ingress controller pod for combination of ingress configuration change sets 2+3 530, temporary ingress controller pod for combination of ingress configuration change sets 2+4 532, and temporary ingress controller pod for combination of ingress configuration change sets 3+4 534) for temporary ingress controller configuration verification.

Also at 528, API server 526 reads the temporary ingress controller configurations from the temporary configuration map to worker node 504. Worker node 504, using ingress controller extension 512, loads the temporary ingress controller configurations into corresponding temporary ingress controllers that correspond to particular combinations of ingress configuration change sets.

At 536, ingress controller extension 512 performs a health check on temporary ingress controller pod for combination of ingress configuration change sets 2+3 530, temporary ingress controller pod for combination of ingress configuration change sets 2+4 532, and temporary ingress controller pod for combination of ingress configuration change sets 3+4 534 to determine whether at least one temporary ingress controller pod is crashed due to a temporary ingress controller having an invalid configuration, which corresponds to a particular combination of ingress configuration change sets having conflicting configuration changes. In this example, the health check determined that temporary ingress controller pod for combination of ingress configuration change sets 3+4 534 crashed and is not working because temporary ingress controller 538 has an invalid configuration, which corresponds to the combination of ingress configuration change sets 3+4 having conflicting ingress configuration changes.

At 540, in response to detecting the crash of temporary ingress controller pod for combination of ingress configuration change sets 3+4 534, ingress controller extension 512 invokes API server 526 to remove the temporary ingress controller configuration, which corresponds to ingress configuration change set 4 causing the conflict, from the temporary configuration map. It should be noted that ingress configuration change set 4 is selected to be removed rather than ingress configuration change set 3 because ingress configuration change set 4 has a later timestamp (e.g., ingress configuration change set 4 was submitted and read into the depth queue after ingress configuration change set 3). Furthermore, ingress controller extension 512 notifies user 542 that ingress configuration change set 4 created the conflict causing temporary ingress controller pod for combination of ingress configuration change sets 3+4 534 to crash.

Figure 6A:
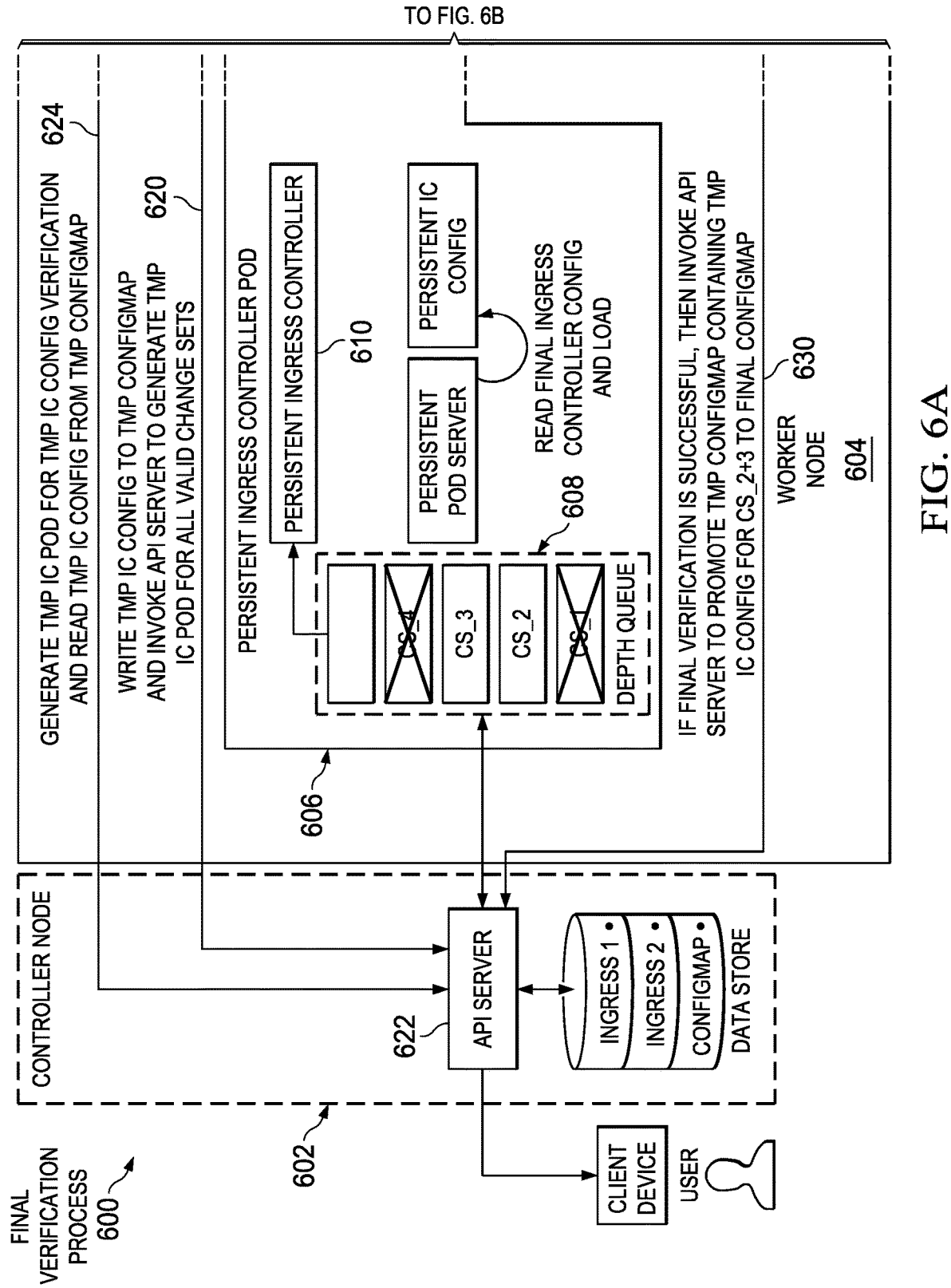
FIGS. 6A-6B are a diagram illustrating an example of a final verification process in accordance with an illustrative embodiment.
Figure 6B:
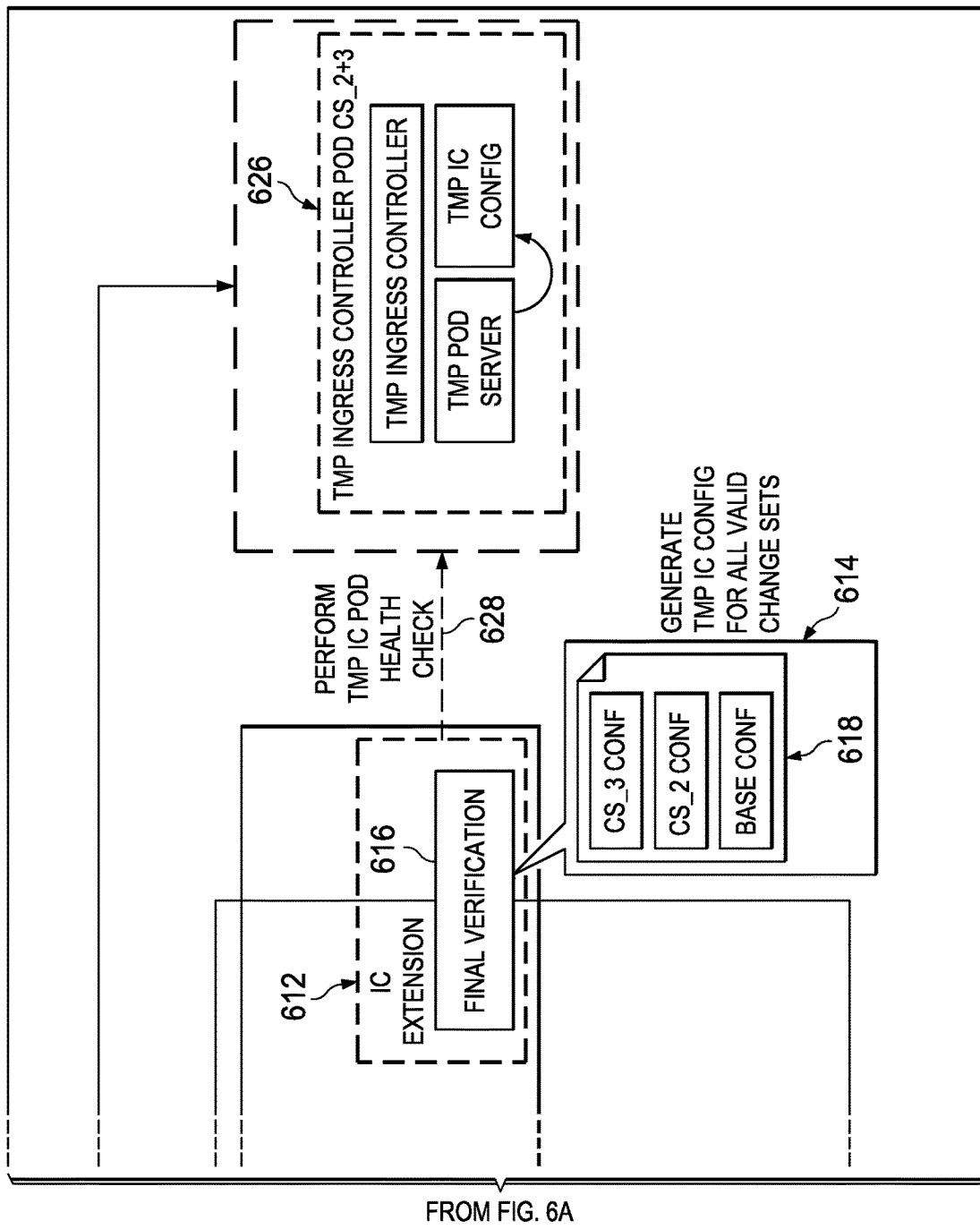
Figure 7A:
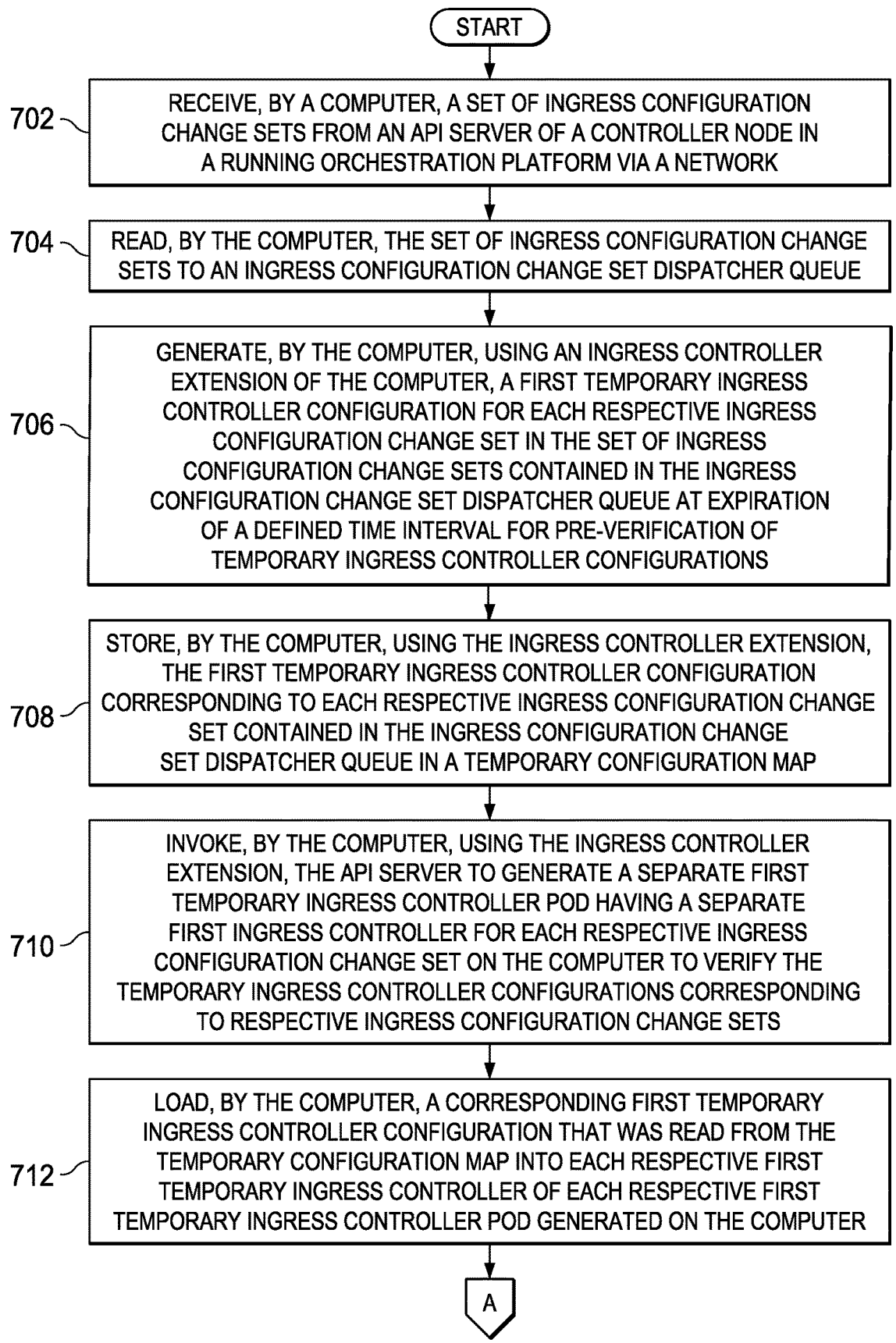
FIGS. 7A-7F are a flowchart illustrating a process for dynamically verifying ingress configuration changes in a running orchestration platform in accordance with an illustrative embodiment.
Figure 7B:
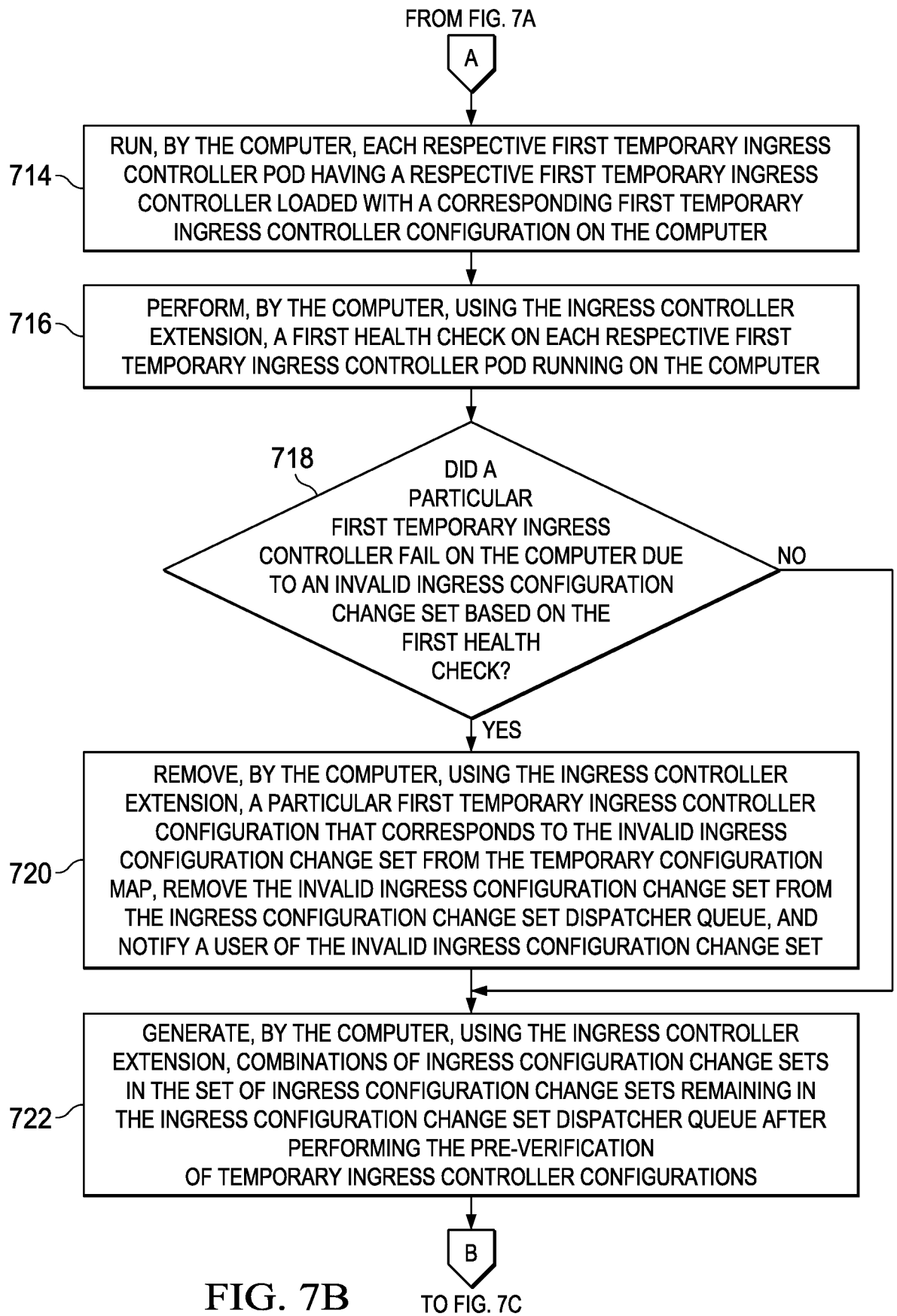
Figure 7C:
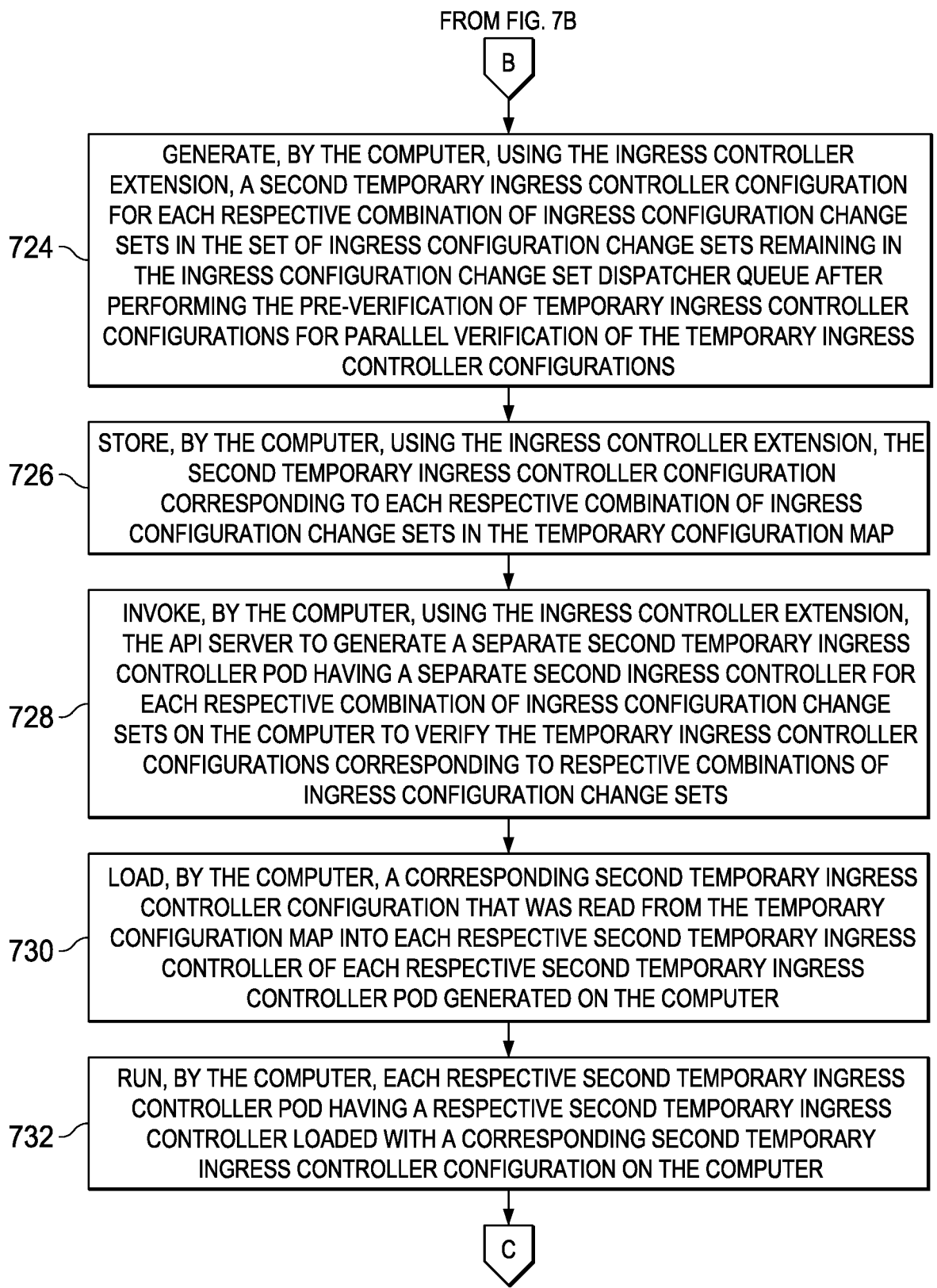
Figure 7D:
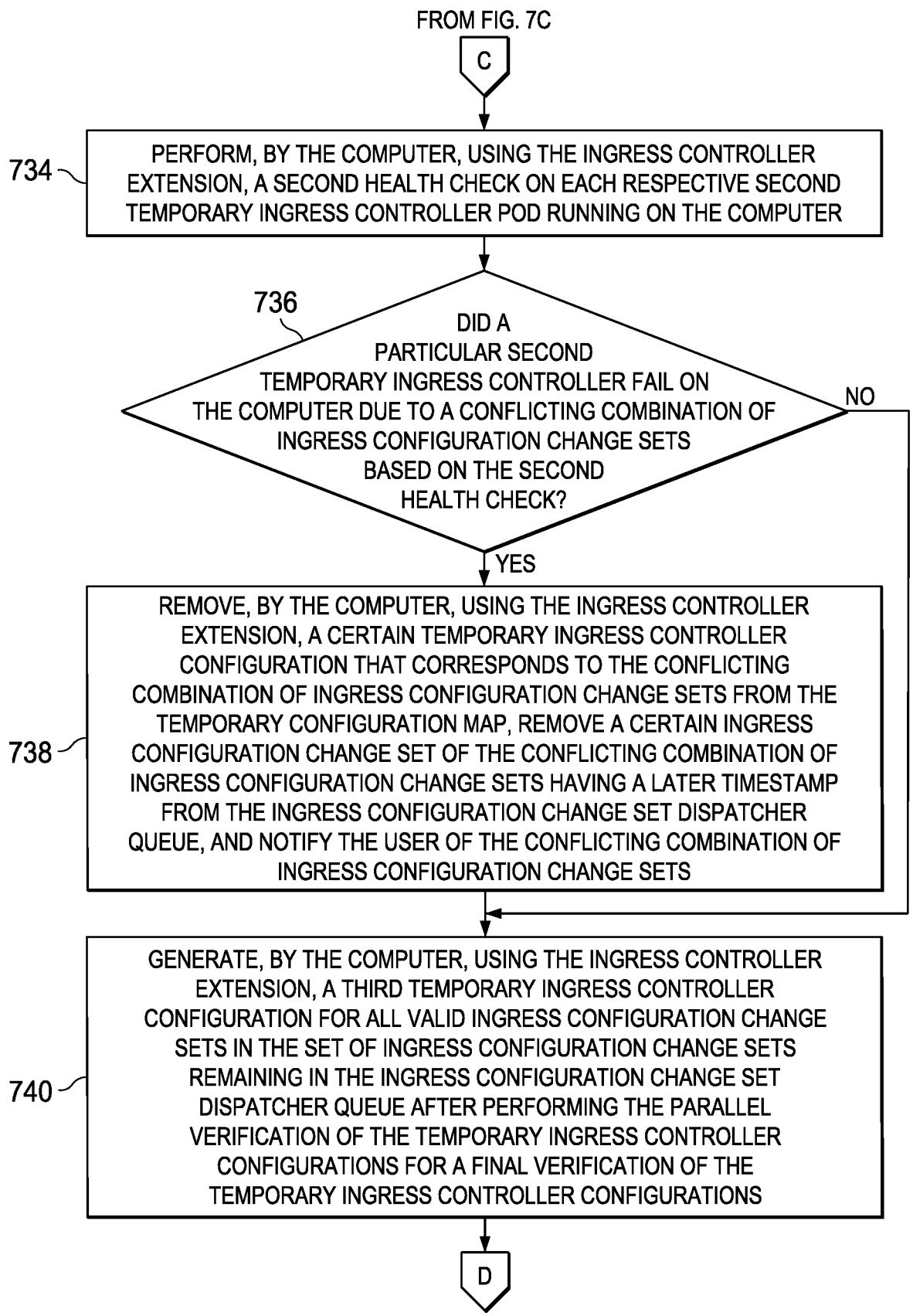
Figure 7E:
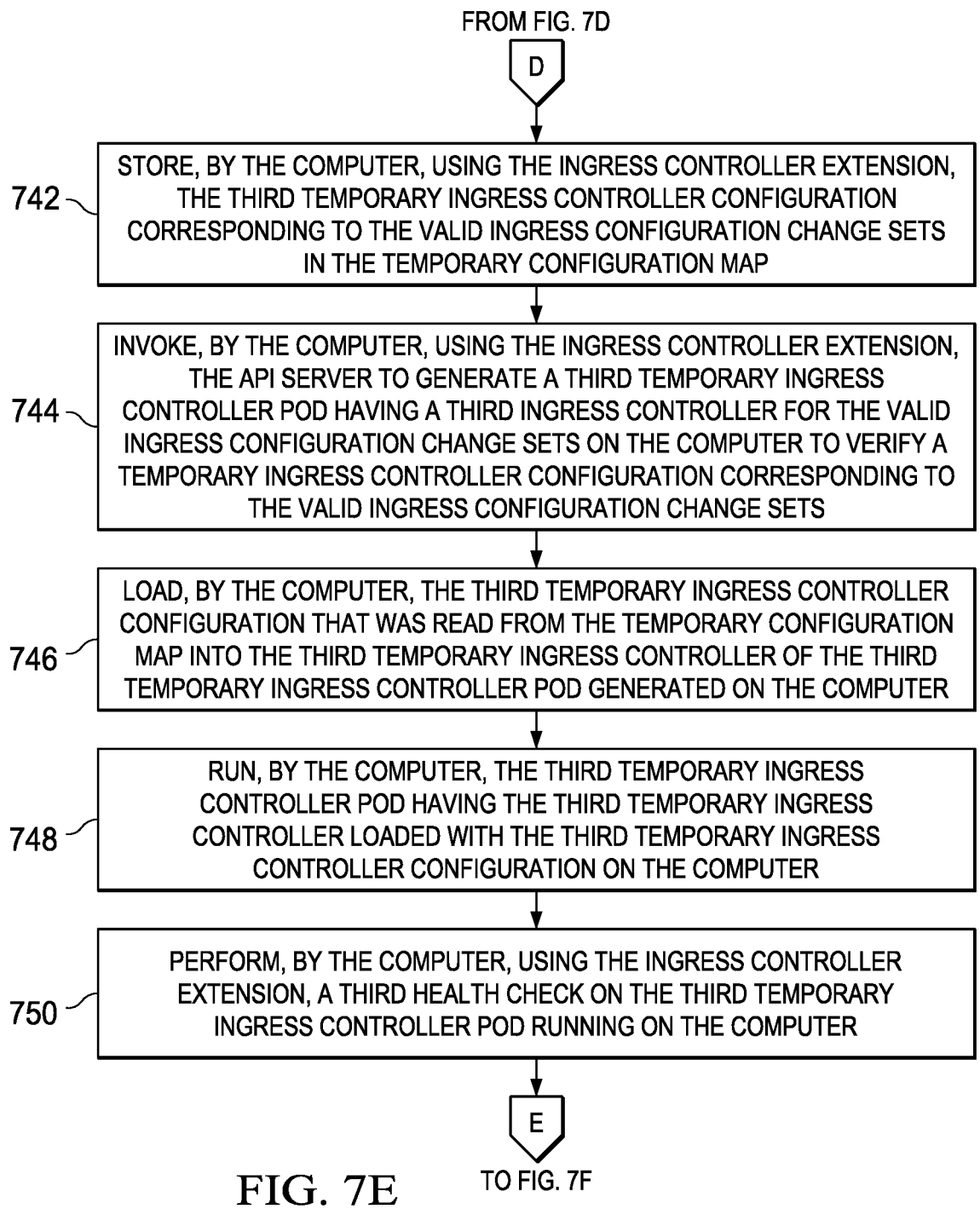
Figure 7F:
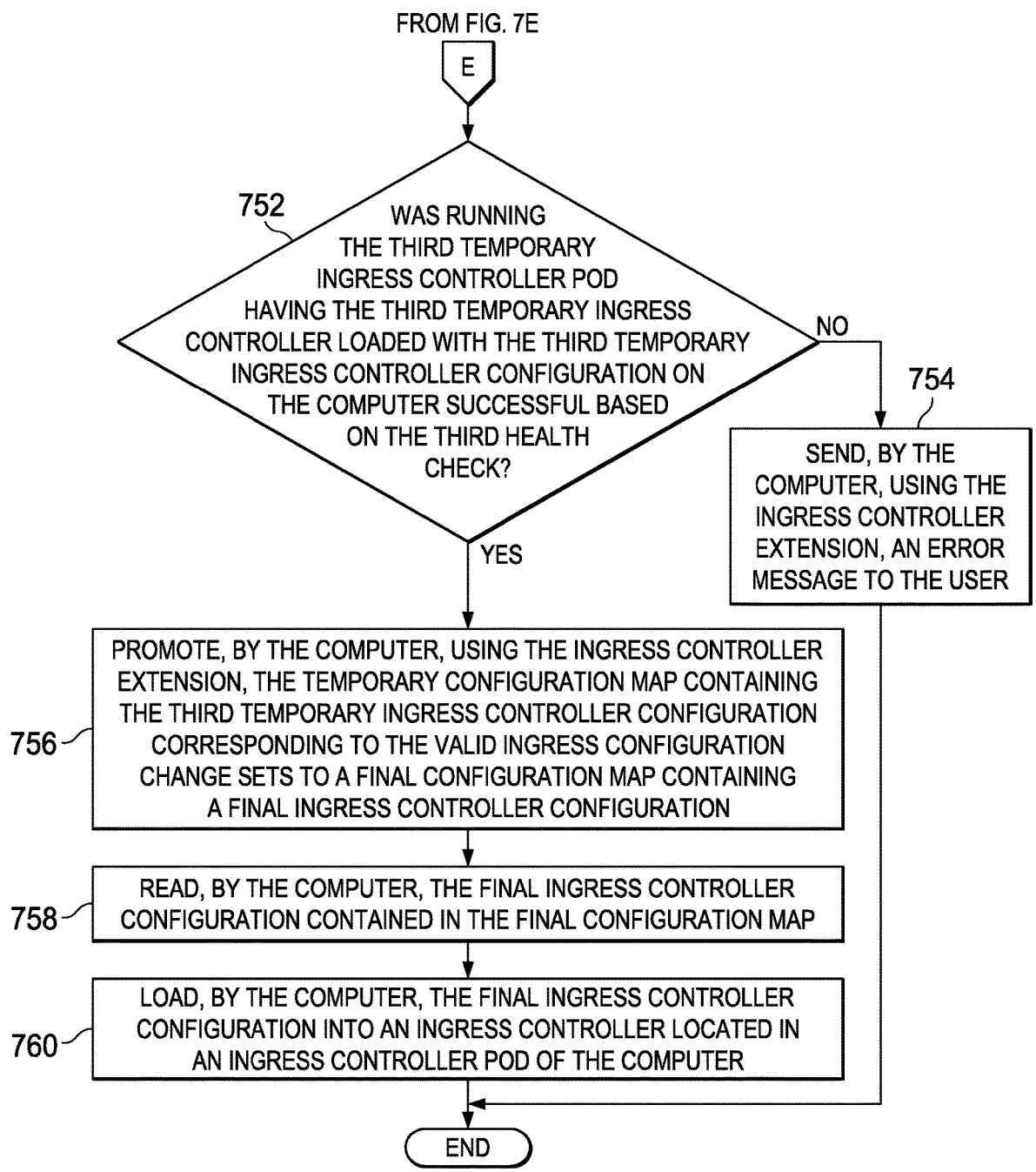

With reference now to FIGS. 6A-6B, a diagram illustrating an example of a final verification process is depicted in accordance with an illustrative embodiment. Final verification process 600 may be implemented in an ingress controller extension, such as, for example, final verification process 334 implemented in ingress controller extension 324 in FIG. 3A.

In this example, final verification process 600 includes controller node 602 and worker node 604, such as, for example, controller node 502 and worker node 504 in FIGS. 5A-5B. Worker node 604 includes persistent ingress controller pod 606, such as, for example, persistent ingress controller pod 506 in FIGS. 5A-5B. Persistent ingress controller pod 606 includes depth queue 608, persistent ingress controller 610, and ingress controller extension 612, such as, for example, depth queue 508, persistent ingress controller 510, and ingress controller extension 512 in FIGS. 5A-5B.

At 614, ingress controller extension 612 utilizes final verification process 616 to generate a temporary ingress controller configuration for all valid ingress configuration change sets remaining in depth queue 608 (e.g., ingress configuration change set 2 (CS_2) and ingress configuration change set 3 (CS_3)) after performing parallel verification process 500 in FIGS. 5A-5B. It should be noted that illustrative embodiments, removed ingress configuration change set 4 (CS_4) from the depth queue after preforming parallel verification and removed ingress configuration change set 1 (CS_1) from the depth queue after performing pre-verification. Final verification process 616 generates temporary ingress controller configuration corresponding to combination of ingress configuration change sets 2+3 (CS_2 Conf, CS_3 Conf) 618 based on the base or currently existing configuration of persistent ingress controller 610.

At 620, ingress controller extension 612 writes the temporary ingress controller configuration corresponding to all remaining valid ingress configuration change sets (e.g., temporary ingress controller configuration corresponding to combination of ingress configuration change sets 2+3 618) to a temporary configuration map and invokes API server 622 to generate a temporary ingress controller pod for all of the valid ingress configuration change sets remaining in depth queue 608. At 624, API server 622 generates the temporary ingress controller pod (e.g., temporary ingress controller pod for ingress configuration change sets 2+3 626) for temporary ingress controller configuration verification.

Also at 624, API server 622 reads the temporary ingress controller configuration from the temporary configuration map to worker node 604. Worker node 604, using ingress controller extension 612, loads the temporary ingress controller configuration into the temporary ingress controller corresponding to the temporary ingress controller pod for remaining valid ingress configuration change sets 2+3.

At 628, ingress controller extension 612 performs a health check on temporary ingress controller pod for ingress configuration change sets 2+3 626 to determine whether temporary ingress controller pod for ingress configuration change sets 2+3 626 is running correctly (e.g., not crashed). At 630, in response to determining that final verification process 616 was successful, ingress controller extension 612 invokes API server 622 to promote the temporary configuration map containing the temporary ingress controller configuration corresponding to ingress configuration change sets 2+3 to a final configuration map. It should be noted that ingress controller extension 612 uses the temporary ingress controller configuration corresponding to ingress configuration change sets 2+3 as a final configuration for persistent ingress controller 610 and loads the final configuration into persistent ingress controller 610.

With reference now to FIGS. 7A-7F, a flowchart illustrating a process for dynamically verifying ingress configuration changes in a running orchestration platform is shown in accordance with an illustrative embodiment. The process shown in FIGS. 7A-7F may be implemented in a computer, such as, for example, worker node 106 in FIG. 1 or data processing system 200 in FIG. 2. For example, the process shown in FIGS. 7A-7F may be implemented in ingress controller extension 218 in FIG. 2.

The process begins when the computer receives a set of ingress configuration change sets from an API server of a controller node in a running orchestration platform via a network (step 702). The computer reads the set of ingress configuration change sets to an ingress configuration change set dispatcher queue (step 704).

The computer, using an ingress controller extension of the computer, generates a first temporary ingress controller configuration for each respective ingress configuration change set in the set of ingress configuration change sets contained in the ingress configuration change set dispatcher queue at expiration of a defined time interval for pre-verification of temporary ingress controller configurations (step 706). The computer, using the ingress controller extension, stores the first temporary ingress controller configuration corresponding to each respective ingress configuration change set contained in the ingress configuration change set dispatcher queue in a temporary configuration map (step 708).

The computer, using the ingress controller extension, invokes the API server to generate a separate first temporary ingress controller pod having a separate first ingress controller for each respective ingress configuration change set on the computer to verify the temporary ingress controller configurations corresponding to respective ingress configuration change sets (step 710). The computer loads a corresponding first temporary ingress controller configuration that was read from the temporary configuration map into each respective first temporary ingress controller of each respective first temporary ingress controller pod generated on the computer (step 712).

The computer runs each respective first temporary ingress controller pod having a respective first temporary ingress controller loaded with a corresponding first temporary ingress controller configuration on the computer (step 714). The computer, using the ingress controller extension, performs a first health check on each respective first temporary ingress controller pod running on the computer (step 716).

The computer makes a determination as to whether a particular first temporary ingress controller failed on the computer due to an invalid ingress configuration change set based on the first health check (step 718). If the computer determines that no first temporary ingress controller failed on the computer due to an invalid ingress configuration change set based on the first health check, no output of step 718, then the process proceeds to step 722. If the computer determines that a particular first temporary ingress controller did fail on the computer due to an invalid ingress configuration change set based on the first health check, yes output of step 718, then the computer, using the ingress controller extension, removes a particular first temporary ingress controller configuration that corresponds to the invalid ingress configuration change set from the temporary configuration map, removes the invalid ingress configuration change set from the ingress configuration change set dispatcher queue, and notifies a user of the invalid ingress configuration change set (step 720).

Afterward, the computer, using the ingress controller extension, generates combinations of ingress configuration change sets in the set of ingress configuration change sets remaining in the ingress configuration change set dispatcher queue after performing the pre-verification of temporary ingress controller configurations (step 722). The computer, using the ingress controller extension, generates a second temporary ingress controller configuration for each respective combination of ingress configuration change sets in the set of ingress configuration change sets remaining in the ingress configuration change set dispatcher queue after performing the pre-verification of temporary ingress controller configurations for parallel verification of the temporary ingress controller configurations (step 724). The computer, using the ingress controller extension, stores the second temporary ingress controller configuration corresponding to each respective combination of ingress configuration change sets in the temporary configuration map (step 726).

The computer, using the ingress controller extension, invokes the API server to generate a separate second temporary ingress controller pod having a separate second ingress controller for each respective combination of ingress configuration change sets on the computer to verify the temporary ingress controller configurations corresponding to respective combinations of ingress configuration change sets (step 728). The computer loads a corresponding second temporary ingress controller configuration that was read from the temporary configuration map into each respective second temporary ingress controller of each respective second temporary ingress controller pod generated on the computer (step 730).

The computer runs each respective second temporary ingress controller pod having a respective second temporary ingress controller loaded with a corresponding second temporary ingress controller configuration on the computer (step 732). The computer, using the ingress controller extension, performs a second health check on each respective second temporary ingress controller pod running on the computer (step 734).

The computer makes a determination as to whether a particular second temporary ingress controller failed on the computer due to a conflicting combination of ingress configuration change sets based on the second health check (step 736). If the computer determines that no second temporary ingress controller failed on the computer due to a conflicting combination of ingress configuration change sets based on the second health check, no output of step 736, then the process proceeds to step 740. If the computer determines that a particular second temporary ingress controller failed on the computer due to a conflicting combination of ingress configuration change sets based on the second health check, yes output of step 736, then the computer, using the ingress controller extension, removes a certain temporary ingress controller configuration that corresponds to the conflicting combination of ingress configuration change sets from the temporary configuration map, removes a certain ingress configuration change set of the conflicting combination of ingress configuration change sets having a later timestamp from the ingress configuration change set dispatcher queue, and notifies the user of the conflicting combination of ingress configuration change sets (step 738).

Subsequently, the computer, using the ingress controller extension, generates a third temporary ingress controller configuration for all valid ingress configuration change sets in the set of ingress configuration change sets remaining in the ingress configuration change set dispatcher queue after performing the parallel verification of the temporary ingress controller configurations for a final verification of the temporary ingress controller configurations (step 740). The computer, using the ingress controller extension, stores the third temporary ingress controller configuration corresponding to the valid ingress configuration change sets in the temporary configuration map (step 742).

The computer, using the ingress controller extension, invokes the API server to generate a third temporary ingress controller pod having a third ingress controller for the valid ingress configuration change sets on the computer to verify a temporary ingress controller configuration corresponding to the valid ingress configuration change sets (step 744). The computer loads the third temporary ingress controller configuration that was read from the temporary configuration map into the third temporary ingress controller of the third temporary ingress controller pod generated on the computer (step 746).

The computer runs the third temporary ingress controller pod having the third temporary ingress controller loaded with the third temporary ingress controller configuration on the computer (step 748). The computer, using the ingress controller extension, performs a third health check on the third temporary ingress controller pod running on the computer (step 750).

The computer makes a determination as to whether running the third temporary ingress controller pod having the third temporary ingress controller loaded with the third temporary ingress controller configuration on the computer was successful based on the third health check (step 752). If the computer determines that running the third temporary ingress controller pod having the third temporary ingress controller loaded with the third temporary ingress controller configuration on the computer was not successful based on the third health check, no output of step 752, then the computer, using the ingress controller extension, sends an error message to the user (step 754). If the computer determines that running the third temporary ingress controller pod having the third temporary ingress controller loaded with the third temporary ingress controller configuration on the computer was successful based on the third health check, yes output of step 752, then the computer, using the ingress controller extension, promotes the temporary configuration map containing the third temporary ingress controller configuration corresponding to the valid ingress configuration change sets to a final configuration map containing a final ingress controller configuration (step 756).

The computer reads the final ingress controller configuration contained in the final configuration map (step 758). The computer loads the final ingress controller configuration into an ingress controller located in an ingress controller pod of the computer (step 760). Thereafter, the process terminates.

Figure 8:
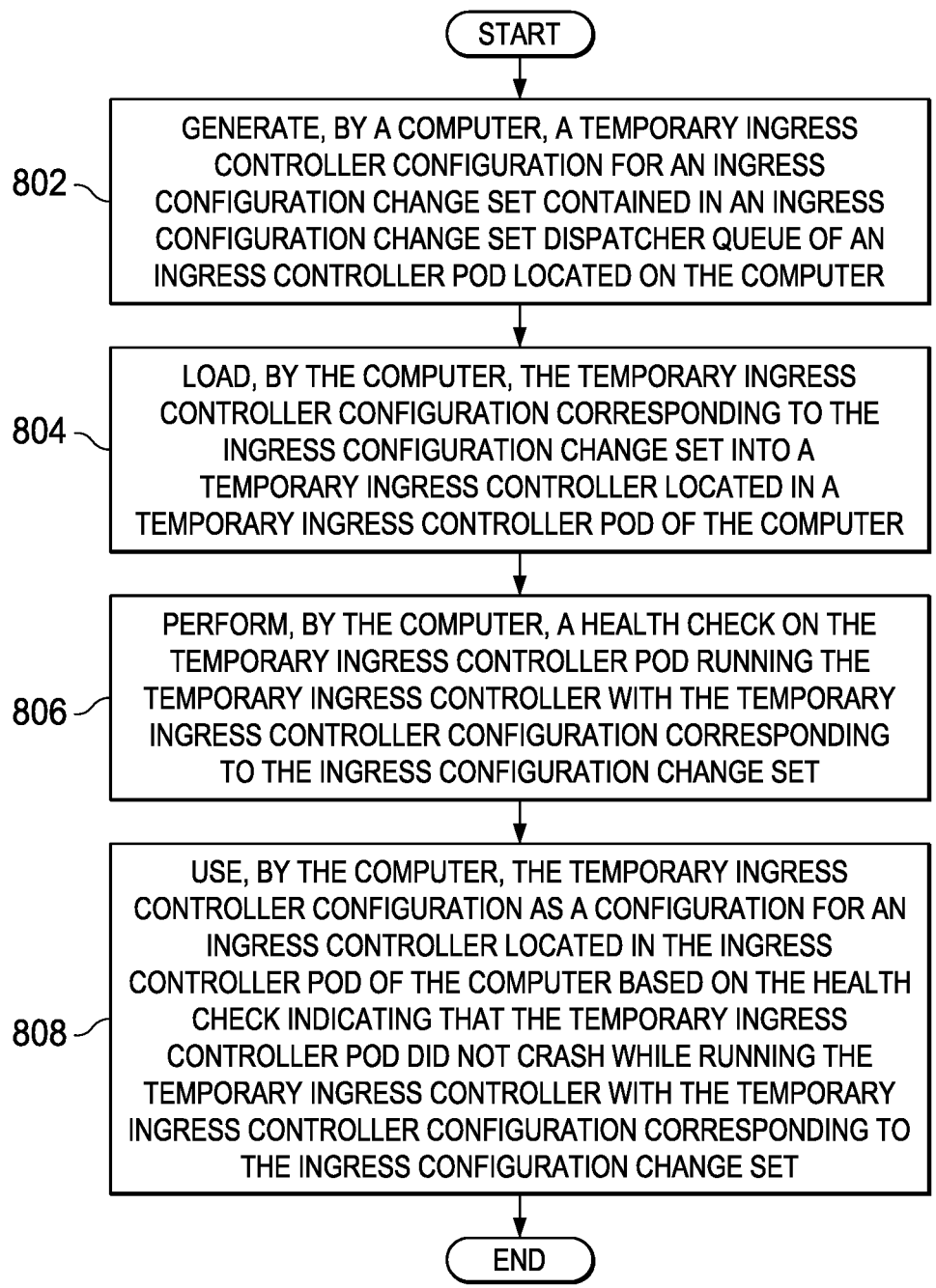
FIG. 8 is a flowchart illustrating a process for verifying a temporary ingress controller configuration corresponding to an ingress configuration change set in accordance with an illustrative embodiment.

With reference now to FIG. 8, a flowchart illustrating a process for verifying a temporary ingress controller configuration corresponding to an ingress configuration change set is shown in accordance with an illustrative embodiment. The process shown in FIG. 8 may be implemented in a computer, such as, for example, worker node 106 in FIG. 1 or data processing system 200 in FIG. 2. For example, the process shown in FIG. 8 may be implemented in ingress controller extension 218 in FIG. 2.

The process begins when the computer generates a temporary ingress controller configuration for an ingress configuration change set contained in an ingress configuration change set dispatcher queue of an ingress controller pod located on the computer (step 802). The computer loads the temporary ingress controller configuration corresponding to the ingress configuration change set into a temporary ingress controller located in a temporary ingress controller pod of the computer (step 804). The computer performs a health check on the temporary ingress controller pod running the temporary ingress controller with the temporary ingress controller configuration corresponding to the ingress configuration change set (step 806). The computer uses the temporary ingress controller configuration as a configuration for an ingress controller located in the ingress controller pod of the computer based on the health check indicating that the temporary ingress controller pod did not crash while running the temporary ingress controller with the temporary ingress controller configuration corresponding to the ingress configuration change set (step 808). Thereafter, the process terminates.

Thus, illustrative embodiments of the present invention provide a computer-implemented method, computer system, and computer program product for dynamically verifying whether incoming ingress configuration changes to a running orchestration platform are valid based on performing pre-verification, parallel verification, and final verification processes on temporary ingress controller configurations that correspond to different incoming ingress configuration changes using temporary ingress controller pods on a worker node of the running orchestration platform. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for dynamically verifying ingress configuration changes, the computer-implemented method comprising:

generating, by a computer, a temporary ingress controller configuration for an ingress configuration change set contained in an ingress configuration change set dispatcher queue of an ingress controller pod located on the computer;

loading, by the computer, the temporary ingress controller configuration corresponding to the ingress configuration change set into a temporary ingress controller located in a temporary ingress controller pod of the computer for verifying the ingress configuration change before merging the ingress configuration change to the ingress controller pod located on the computer;

performing, by the computer, a health check on the temporary ingress controller pod running the temporary ingress controller with the temporary ingress controller configuration corresponding to the ingress configuration change set; and using, by the computer, the temporary ingress controller configuration as a configuration for an ingress controller located in the ingress controller pod of the computer based on the health check indicating that the temporary ingress controller pod did not crash while running the temporary ingress controller with the temporary ingress controller configuration corresponding to the ingress configuration change set.

2. The computer-implemented method of claim 1 further comprising:

receiving, by the computer, a set of ingress configuration change sets from an application programming interface (API) server of a controller node in a running orchestration platform via a network;

reading, by the computer, the set of ingress configuration change sets to the ingress configuration change set dispatcher queue; and generating, by the computer, using an ingress controller extension of the computer, a first temporary ingress controller configuration for each respective ingress configuration change set in the set of ingress configuration change sets contained in the ingress configuration change set dispatcher queue at expiration of a defined time interval for pre-verification of temporary ingress controller configurations.

3. The computer-implemented method of claim 2 further comprising:

storing, by the computer, using the ingress controller extension, the first temporary ingress controller configuration corresponding to each respective ingress configuration change set contained in the ingress configuration change set dispatcher queue in a temporary configuration map;

invoking, by the computer, using the ingress controller extension, the API server to generate a separate first temporary ingress controller pod having a separate first ingress controller for each respective ingress configuration change set on the computer to verify temporary ingress controller configurations corresponding to respective ingress configuration change sets; and loading, by the computer, a corresponding first temporary ingress controller configuration that was read from the temporary configuration map into each respective first temporary ingress controller of each respective first temporary ingress controller pod generated on the computer.

4. The computer-implemented method of claim 3 further comprising:

running, by the computer, each respective first temporary ingress controller pod having a respective first temporary ingress controller loaded with a corresponding first temporary ingress controller configuration on the computer;

performing, by the computer, using the ingress controller extension, a first health check on each respective first temporary ingress controller pod running on the computer;

determining, by the computer, whether a particular first temporary ingress controller failed on the computer due to an invalid ingress configuration change set based on the first health check; and removing, by the computer, using the ingress controller extension, a particular first temporary ingress controller configuration that corresponds to the invalid ingress configuration change set from the temporary configuration map, removing the invalid ingress configuration change set from the ingress configuration change set dispatcher queue, and notifying a user of the invalid ingress configuration change set in response to the computer determining that the particular first temporary ingress controller failed on the computer due to an invalid ingress configuration change set based on the first health check.

5. The computer-implemented method of claim 4 further comprising:

generating, by the computer, using the ingress controller extension, combinations of ingress configuration change sets remaining in the ingress configuration change set dispatcher queue after performing the pre-verification of temporary ingress controller configurations;

generating, by the computer, using the ingress controller extension, a second temporary ingress controller configuration for each respective combination of ingress configuration change sets remaining in the ingress configuration change set dispatcher queue after performing the pre-verification of temporary ingress controller configurations for parallel verification of temporary ingress controller configurations;

storing, by the computer, using the ingress controller extension, the second temporary ingress controller configuration corresponding to each respective combination of ingress configuration change sets in the temporary configuration map;

invoking, by the computer, using the ingress controller extension, the API server to generate a separate second temporary ingress controller pod having a separate second ingress controller for each respective combination of ingress configuration change sets on the computer to verify temporary ingress controller configurations corresponding to respective combinations of ingress configuration change sets; and loading, by the computer, a corresponding second temporary ingress controller configuration that was read from the temporary configuration map into each respective second temporary ingress controller of each respective second temporary ingress controller pod generated on the computer.

6. The computer-implemented method of claim 5 further comprising:

running, by the computer, each respective second temporary ingress controller pod having a respective second temporary ingress controller loaded with a corresponding second temporary ingress controller configuration on the computer;

performing, by the computer, using the ingress controller extension, a second health check on each respective second temporary ingress controller pod running on the computer;

determining, by the computer, whether a particular second temporary ingress controller failed on the computer due to a conflicting combination of ingress configuration change sets based on the second health check; and removing, by the computer, using the ingress controller extension, a certain temporary ingress controller configuration that corresponds to the conflicting combination of ingress configuration change sets from the temporary configuration map, removing a certain ingress configuration change set of the conflicting combination of ingress configuration change sets having a later timestamp from the ingress configuration change set dispatcher queue, and notifying the user of the conflicting combination of ingress configuration change sets in response to the computer determining that the particular second temporary ingress controller failed on the computer due to a conflicting combination of ingress configuration change sets based on the second health check.

7. The computer-implemented method of claim 6 further comprising:

generating, by the computer, using the ingress controller extension, a third temporary ingress controller configuration for all valid ingress configuration change sets remaining in the ingress configuration change set dispatcher queue after performing the parallel verification of temporary ingress controller configurations for a final verification of temporary ingress controller configurations;

storing, by the computer, using the ingress controller extension, the third temporary ingress controller configuration corresponding to the valid ingress configuration change sets in the temporary configuration map;

invoking, by the computer, using the ingress controller extension, the API server to generate a third temporary ingress controller pod having a third ingress controller for the valid ingress configuration change sets on the computer to verify a temporary ingress controller configuration corresponding to the valid ingress configuration change sets; and loading, by the computer, the third temporary ingress controller configuration that was read from the temporary configuration map into the third temporary ingress controller of the third temporary ingress controller pod generated on the computer.

8. The computer-implemented method of claim 7 further comprising:

running, by the computer, the third temporary ingress controller pod having the third temporary ingress controller loaded with the third temporary ingress controller configuration on the computer;

performing, by the computer, using the ingress controller extension, a third health check on the third temporary ingress controller pod running on the computer;

determining, by the computer, whether running the third temporary ingress controller pod having the third temporary ingress controller loaded with the third temporary ingress controller configuration on the computer was successful based on the third health check;

promoting, by the computer, using the ingress controller extension, the temporary configuration map containing the third temporary ingress controller configuration corresponding to the valid ingress configuration change sets to a final configuration map containing a final ingress controller configuration in response to the computer determining that running the third temporary ingress controller pod having the third temporary ingress controller loaded with the third temporary ingress controller configuration on the computer was successful based on the third health check;

reading, by the computer, the final ingress controller configuration contained in the final configuration map; and loading, by the computer, the final ingress controller configuration into the ingress controller located in the ingress controller pod of the computer.

9. The computer-implemented method of claim 8 further comprising:

sending, by the computer, using the ingress controller extension, an error message to the user in response to the computer determining that running the third temporary ingress controller pod having the third temporary ingress controller loaded with the third temporary ingress controller configuration on the computer was not successful based on the third health check.

10. A computer system for dynamically verifying ingress configuration changes, the computer system comprising:

a bus system;

a storage device connected to the bus system, wherein the storage device stores program instructions; and a processor connected to the bus system, wherein the processor executes the program instructions to:

generate a temporary ingress controller configuration for an ingress configuration change set contained in an ingress configuration change set dispatcher queue of an ingress controller pod located on the computer system;

load the temporary ingress controller configuration corresponding to the ingress configuration change set into a temporary ingress controller located in a temporary ingress controller pod of the computer system for verifying the ingress configuration change before merging the ingress configuration change to the ingress controller pod located on the computer;

perform a health check on the temporary ingress controller pod running the temporary ingress controller with the temporary ingress controller configuration corresponding to the ingress configuration change set; and use the temporary ingress controller configuration as a configuration for an ingress controller located in the ingress controller pod of the computer system based on the health check indicating that the temporary ingress controller pod did not crash while running the temporary ingress controller with the temporary ingress controller configuration corresponding to the ingress configuration change set.

11. The computer system of claim 10, wherein the processor further executes the program instructions to:

receive a set of ingress configuration change sets from an application programming interface (API) server of a controller node in a running orchestration platform via a network;

read the set of ingress configuration change sets to the ingress configuration change set dispatcher queue; and generate, using an ingress controller extension of the computer system, a first temporary ingress controller configuration for each respective ingress configuration change set in the set of ingress configuration change sets contained in the ingress configuration change set dispatcher queue at expiration of a defined time interval for pre-verification of temporary ingress controller configurations.

12. The computer system of claim 11, wherein the processor further executes the program instructions to:

store, using the ingress controller extension, the first temporary ingress controller configuration corresponding to each respective ingress configuration change set contained in the ingress configuration change set dispatcher queue in a temporary configuration map;

invoke, using the ingress controller extension, the API server to generate a separate first temporary ingress controller pod having a separate first ingress controller for each respective ingress configuration change set on the computer to verify temporary ingress controller configurations corresponding to respective ingress configuration change sets; and load a corresponding first temporary ingress controller configuration that was read from the temporary configuration map into each respective first temporary ingress controller of each respective first temporary ingress controller pod generated on the computer system.

13. The computer system of claim 12, wherein the processor further executes the program instructions to:

run each respective first temporary ingress controller pod having a respective first temporary ingress controller loaded with a corresponding first temporary ingress controller configuration on the computer system;

perform, using the ingress controller extension, a first health check on each respective first temporary ingress controller pod running on the computer system;

determine whether a particular first temporary ingress controller failed on the computer due to an invalid ingress configuration change set based on the first health check; and remove, using the ingress controller extension, a particular first temporary ingress controller configuration that corresponds to the invalid ingress configuration change set from the temporary configuration map, remove the invalid ingress configuration change set from the ingress configuration change set dispatcher queue, and notify a user of the invalid ingress configuration change set in response to determining that the particular first temporary ingress controller failed on the computer system due to an invalid ingress configuration change set based on the first health check.

14. The computer system of claim 13, wherein the processor further executes the program instructions to:

generate, using the ingress controller extension, combinations of ingress configuration change sets remaining in the ingress configuration change set dispatcher queue after performing the pre-verification of temporary ingress controller configurations;

generate, using the ingress controller extension, a second temporary ingress controller configuration for each respective combination of ingress configuration change sets remaining in the ingress configuration change set dispatcher queue after performing the pre-verification of temporary ingress controller configurations for parallel verification of temporary ingress controller configurations;

store, using the ingress controller extension, the second temporary ingress controller configuration corresponding to each respective combination of ingress configuration change sets in the temporary configuration map;

invoke, using the ingress controller extension, the API server to generate a separate second temporary ingress controller pod having a separate second ingress controller for each respective combination of ingress configuration change sets on the computer system to verify temporary ingress controller configurations corresponding to respective combinations of ingress configuration change sets; and load a corresponding second temporary ingress controller configuration that was read from the temporary configuration map into each respective second temporary ingress controller of each respective second temporary ingress controller pod generated on the computer system.

15. A computer program product for dynamically verifying ingress configuration changes, the computer program product comprising a computer-readable storage medium having program instructions embodied therewith, the program instructions executable by a computer to cause the computer to perform a method of:

generating, by the computer, a temporary ingress controller configuration for an ingress configuration change set contained in an ingress configuration change set dispatcher queue of an ingress controller pod located on the computer;

loading, by the computer, the temporary ingress controller configuration corresponding to the ingress configuration change set into a temporary ingress controller located in a temporary ingress controller pod of the computer for verifying the ingress configuration change before merging the ingress configuration change to the ingress controller pod located on the computer;

performing, by the computer, a health check on the temporary ingress controller pod running the temporary ingress controller with the temporary ingress controller configuration corresponding to the ingress configuration change set; and using, by the computer, the temporary ingress controller configuration as a configuration for an ingress controller located in the ingress controller pod of the computer based on the health check indicating that the temporary ingress controller pod did not crash while running the temporary ingress controller with the temporary ingress controller configuration corresponding to the ingress configuration change set.

16. The computer program product of claim 15 further comprising:
receiving, by the computer, a set of ingress configuration change sets from an application programming interface (API) server of a controller node in a running orchestration platform via a network;
reading, by the computer, the set of ingress configuration change sets to the ingress configuration change set dispatcher queue; and
generating, by the computer, using an ingress controller extension of the computer, a first temporary ingress controller configuration for each respective ingress configuration change set in the set of ingress configuration change sets contained in the ingress configuration change set dispatcher queue at expiration of a defined time interval for pre-verification of temporary ingress controller configurations.

17. The computer program product of claim 16 further comprising:
storing, by the computer, using the ingress controller extension, the first temporary ingress controller configuration corresponding to each respective ingress configuration change set contained in the ingress configuration change set dispatcher queue in a temporary configuration map;
invoking, by the computer, using the ingress controller extension, the API server to generate a separate first temporary ingress controller pod having a separate first ingress controller for each respective ingress configuration change set on the computer to verify temporary ingress controller configurations corresponding to respective ingress configuration change sets; and
loading, by the computer, a corresponding first temporary ingress controller configuration that was read from the temporary configuration map into each respective first temporary ingress controller of each respective first temporary ingress controller pod generated on the computer.

18. The computer program product of claim 17 further comprising:
running, by the computer, each respective first temporary ingress controller pod having a respective first temporary ingress controller loaded with a corresponding first temporary ingress controller configuration on the computer;
performing, by the computer, using the ingress controller extension, a first health check on each respective first temporary ingress controller pod running on the computer;
determining, by the computer, whether a particular first temporary ingress controller failed on the computer due to an invalid ingress configuration change set based on the first health check; and
removing, by the computer, using the ingress controller extension, a particular first temporary ingress controller configuration that corresponds to the invalid ingress configuration change set from the temporary configuration map, removing the invalid ingress configuration change set from the ingress configuration change set dispatcher queue, and notifying a user of the invalid ingress configuration change set in response to the computer determining that the particular first temporary ingress controller failed on the computer due to an invalid ingress configuration change set based on the first health check.

19. The computer program product of claim 18 further comprising:
generating, by the computer, using the ingress controller extension, combinations of ingress configuration change sets remaining in the ingress configuration change set dispatcher queue after performing the pre-verification of temporary ingress controller configurations;
generating, by the computer, using the ingress controller extension, a second temporary ingress controller configuration for each respective combination of ingress configuration change sets remaining in the ingress configuration change set dispatcher queue after performing the pre-verification of temporary ingress controller configurations for parallel verification of temporary ingress controller configurations;
storing, by the computer, using the ingress controller extension, the second temporary ingress controller configuration corresponding to each respective combination of ingress configuration change sets in the temporary configuration map;
invoking, by the computer, using the ingress controller extension, the API server to generate a separate second temporary ingress controller pod having a separate second ingress controller for each respective combination of ingress configuration change sets on the computer to verify temporary ingress controller configurations corresponding to respective combinations of ingress configuration change sets; and
loading, by the computer, a corresponding second temporary ingress controller configuration that was read from the temporary configuration map into each respective second temporary ingress controller of each respective second temporary ingress controller pod generated on the computer.

20. The computer program product of claim 19 further comprising:
running, by the computer, each respective second temporary ingress controller pod having a respective second temporary ingress controller loaded with a corresponding second temporary ingress controller configuration on the computer;
performing, by the computer, using the ingress controller extension, a second health check on each respective second temporary ingress controller pod running on the computer;
determining, by the computer, whether a particular second temporary ingress controller failed on the computer due to a conflicting combination of ingress configuration change sets based on the second health check; and
removing, by the computer, using the ingress controller extension, a certain temporary ingress controller configuration that corresponds to the conflicting combination of ingress configuration change sets from the temporary configuration map, removing a certain ingress configuration change set of the conflicting combination of ingress configuration change sets having a later timestamp from the ingress configuration change set dispatcher queue, and notifying the user of the conflicting combination of ingress configuration change sets in response to the computer determining that the particular second temporary ingress controller failed on the computer due to a conflicting combination of ingress configuration change sets based on the second health check.

* * * * *